(12) United States Patent
Yurgevich

(10) Patent No.: US 8,490,806 B2
(45) Date of Patent: Jul. 23, 2013

(54) CARGO CARRYING CONTAINER THAT CAN BE INTERFACED WITH DIFFERENT CHASSIS CONFIGURATIONS

(75) Inventor: Howard Yurgevich, Chula Vista, CA (US)

(73) Assignee: Hyundai Translead, San Diego, CA (US)

( * ) Notice: Subject to any disclaimer, the term of this patent is extended or adjusted under 35 U.S.C. 154(b) by 902 days.

(21) Appl. No.: 12/584,169

(22) Filed: Sep. 1, 2009

(65) Prior Publication Data

US 2011/0049137 A1 Mar. 3, 2011

(51) Int. Cl.
*B60P 1/64* (2006.01)
*B65D 88/00* (2006.01)

(52) U.S. Cl.
USPC .............................. 220/1.5; 410/82

(58) Field of Classification Search
USPC .................. 220/1.5; 24/287, 523, 590.1, 629, 24/303, 66.1, 251.5; 410/82
See application file for complete search history.

(56) References Cited

U.S. PATENT DOCUMENTS

| | | | |
|---|---|---|---|
| 3,584,824 A | 6/1971 | Belcer | |
| 3,618,999 A | 11/1971 | Hlinsky | |
| 3,621,236 A | 11/1971 | Hlinsky | |
| 3,972,439 A * | 8/1976 | DiMartino | 24/287 |
| 4,165,007 A | 8/1979 | Brown | |
| 4,844,672 A | 7/1989 | Yurgevich | |
| 4,921,122 A * | 5/1990 | Bornstein et al. | 220/326 |
| 4,925,349 A | 5/1990 | Yurgevich | |
| 5,072,845 A | 12/1991 | Grogan | |
| 5,193,836 A | 3/1993 | Hastings | |
| 5,417,540 A | 5/1995 | Cox | |
| 5,560,088 A * | 10/1996 | Nitsche et al. | 24/287 |
| 5,794,960 A | 8/1998 | Sill et al. | |
| 5,816,423 A | 10/1998 | Fenton et al. | |
| 6,092,967 A | 7/2000 | Schulz et al. | |
| 6,237,794 B1 | 5/2001 | Fenton et al. | |
| 6,309,153 B1 | 10/2001 | Petzitillo, Jr. et al. | |
| 7,621,414 B2 * | 11/2009 | Bederke | 220/1.5 |
| 7,827,738 B2 * | 11/2010 | Abrams et al. | 52/79.1 |
| 2004/0028495 A1 * | 2/2004 | Tomkins et al. | 410/46 |
| 2007/0207017 A1 * | 9/2007 | Boasso et al. | 414/434 |
| 2008/0298939 A1 * | 12/2008 | Lanigan et al. | 414/344 |

* cited by examiner

*Primary Examiner* — Mickey Yu
*Assistant Examiner* — Niki Eloshway
(74) *Attorney, Agent, or Firm* — Wood, Phillips, Katz, Clark & Mortimer

(57) ABSTRACT

In combination: a) a chassis with a first frame and a first twist lock assembly, with an enlarged head, on the first frame; and b) a cargo carrying container mounted in an operative position upon the chassis. The cargo carrying container has a second frame and a second twist lock assembly on the second frame that cooperates with the first twist lock assembly. The second twist lock assembly has a slide plate with an aperture through which the enlarged head is passed in an axial direction with the enlarged head in an assembly/disassembly orientation. The enlarged head in the assembly/disassembly orientation, moving relative to the slide plate in the first axial direction, deflects the slide plate from a first position to allow the enlarged head to pass through the slide plate aperture.

20 Claims, 19 Drawing Sheets

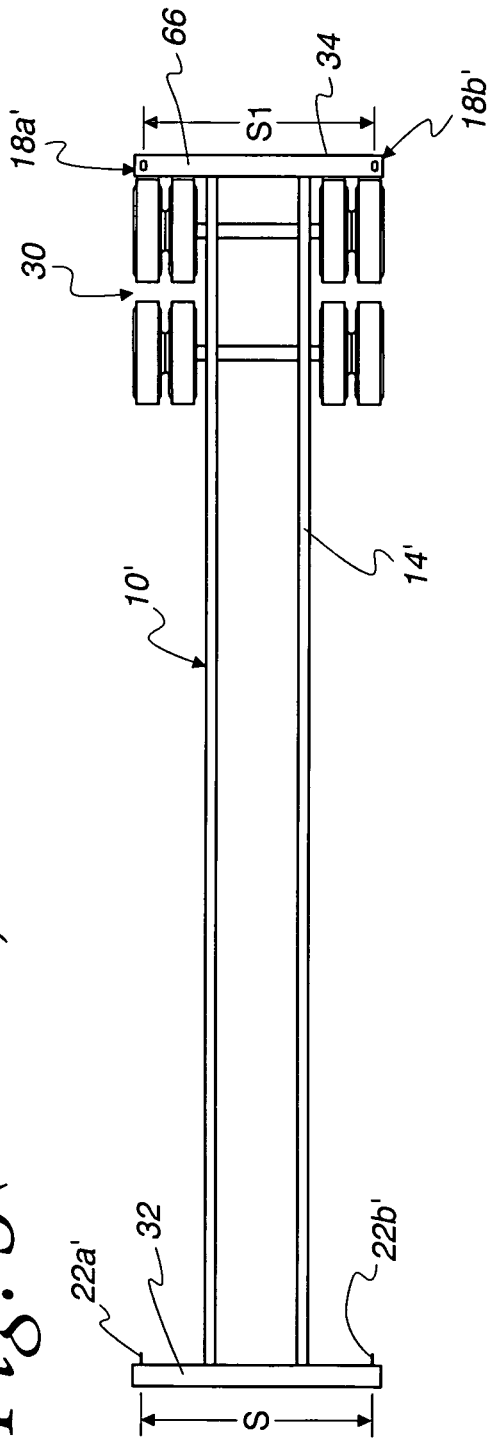
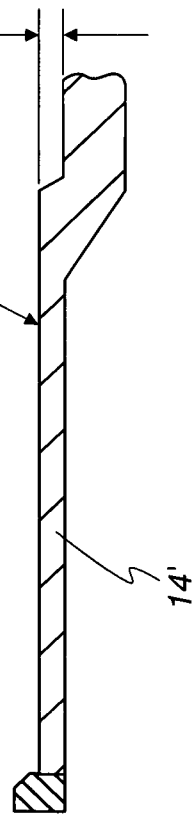
Fig. 3 (Prior Art)
Fig. 4 (Prior Art)

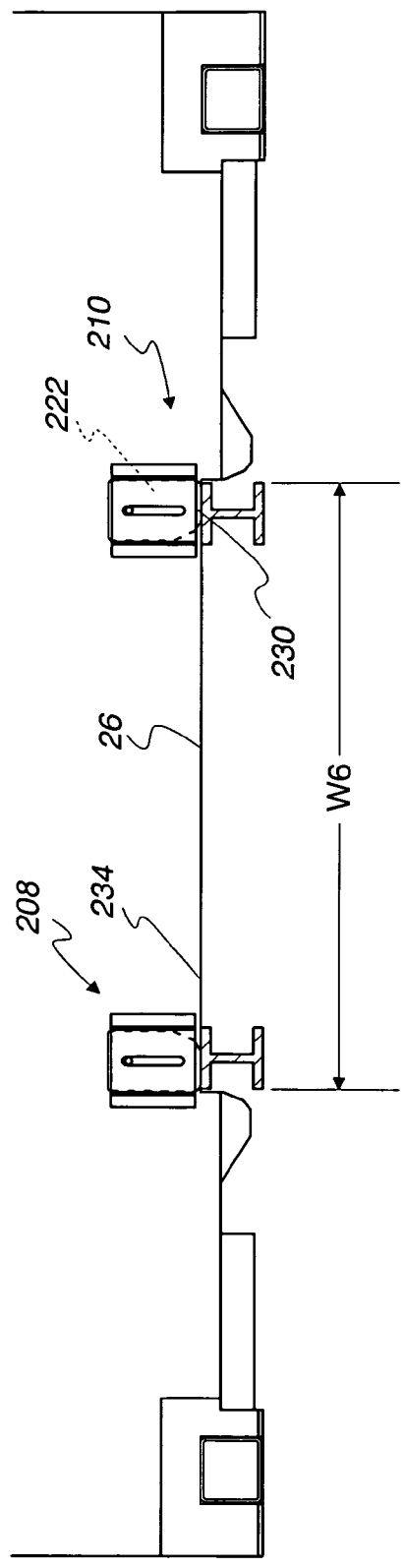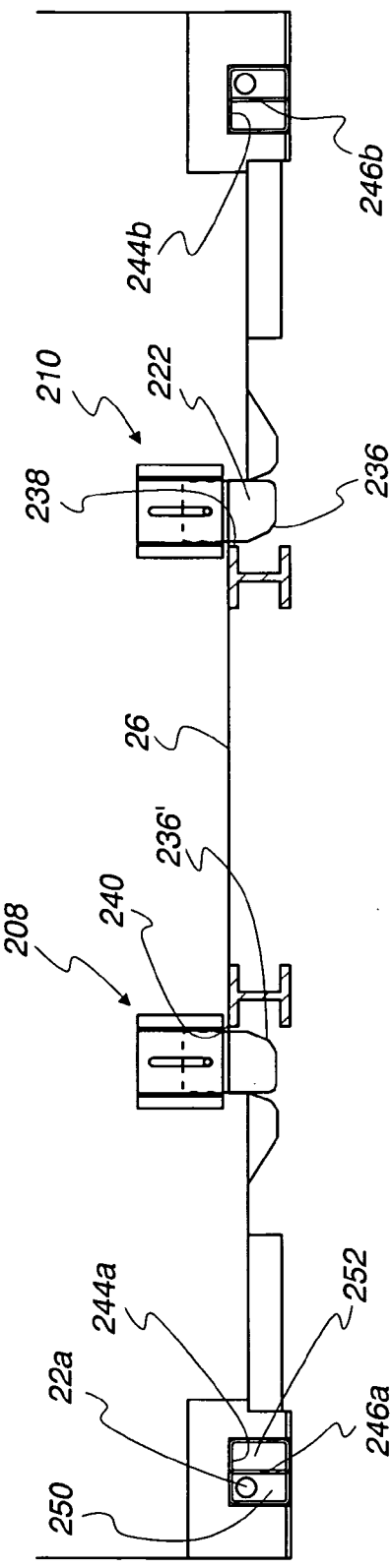

CARGO CARRYING CONTAINER THAT CAN BE INTERFACED WITH DIFFERENT CHASSIS CONFIGURATIONS

BACKGROUND OF THE INVENTION

1. Field of the Invention

This invention relates to cargo carrying containers that are mounted to chassis, as for intermodal transportation and, more particularly, to a cargo carrying container that can be interfaced with chassis having different configurations.

2. Background Art

Throughout North America, there are currently three basic designs that make up a category known as North American Domestic Containers. These containers differ from the more common International Organization for Standardization (ISO) Marine Containers in that they are typically longer, wider, and higher. They are also not intended for ocean-going service and thus the design thereof is required to meet overall strength specifications set up by the Association of American Railroads (AAR) in Specification M-930.

One of the three container designs, considered to be "standard", utilizes the same basic securement and interface features that are used on the ISO Marine Containers. In this design, spaced apertures are provided on the lower front wall on the container to each receive a rearwardly projecting lock pin on the chassis. At the rear, underside of the container, spaced apertures are provided as part of twist lock securement mechanisms. The aperture pairs, at the front and rear locations, are spaced widthwise on 89 inch centers.

Tunnels are provided on these standard containers to accommodate a forward gooseneck on the chassis. The standard tunnel has a 40.5 inch width and a fore-and-aft length of at least 123 inches. The height of the tunnel is 4.75 inches.

By reason of utilizing the ISO Marine Containers interface features, chassis construction can be standardized. These chassis are commonly used by many different operators for general transport and handling by railroads.

A second of the three container designs is similar to the above, "standard" design, except that it is considered a "High-Cube" design. This design typically is 53 feet in length with a reduced tunnel height of 3.625 inches, as compared to the standard 4.75 inches. This allows for a greater inside cargo space height, which matches and competes with more conventional over-the-road semi-trailer units.

This second design requires a special chassis with a reduced-height gooseneck. The remainder of the interfacing is the same as on the standard unit. This allows for some chassis designs, which provide adaptors on the front of the unit, to accept for transportation either the High-Cube design or the standard tunnel height design.

The third design is one that is a more recent development made by an operator with the intent of limiting the use of that individual's containers and chassis to his own operation, while preventing use by any other operator. To accomplish this, the front and rear apertures were changed from the ISO 89 inch center spacing to a spacing of 92.75 inches. Additionally, the width of the tunnel was reduced from 40.5 inches to 32 inches. These changes prevented any intermixing of that operator's containers and chassis with any other operator's units that were designed around the standard.

While this concept effectively controls equipment usage, it has the drawback that the equipment, by reason of its customized configuration, has a reduced resale value. A further drawback is an increase in the acquisition and/or leasing costs as a result of the likely lower anticipated resale value.

It is known in this industry to oversize apertures to allow a single container to adapt to/interface with chassis having different configurations in terms of the center spacing of the front lock pins and rear twist lock hardware. However, as explained in greater detail below, enlarging component receiving apertures, to provide a universal container configuration, may compromise connection between the container and chassis that may cause damage to one or both of these components or, in a worst case, lead to a dangerous condition of partial or full separation of the container from the chassis.

It is also known to adapt a standard tunnel to a non-standard/modified gooseneck, that is narrower in width. In the absence of some modification, the cargo carrying container is unrestricted by the gooseneck against lateral shifting.

More specifically, it is known to provide an adjustable adaptor assembly that can be set to "fill" the lateral/widthwise gap between laterally facing tunnel surfaces and the gooseneck. This adaptor assembly must be adjusted to the particular gooseneck and is thereafter fixed in the selected state.

Adjusting the adaptor assembly is inherently inconvenient and may require repeated trial and error to allow proper interaction between the cargo carrying container and chassis. Since the adaptor assembly is fixed in the selected state, it may interfere as the cargo carrying container and chassis are brought together.

The inconvenience associated with using this type of adaptor assembly may be such that operators forego proper setting up of the adaptor assembly. This may lead to an improperly mounted cargo carrying container that could shift, potentially to a dangerous extent, relative to the chassis, in use.

Heretofore, the industry has made containers with a construction dedicated to one or the other of the standard or modified container configurations, as described above. As a result, it is impractical to build up any substantial inventory of such containers given that demand for one style over the other may be unpredictable. Thus, manufacture may proceed only after firm orders are placed, as a result of which delivery may be delayed.

Additionally, by reason of requiring at least two different designs, manufacturing costs may be increased. This is a result of the fact that portions of a manufacturing facility may have to be dedicated to the separate designs. This is detrimental from the standpoint of efficient space utilization. Additionally, different tooling may be required to construct the separate designs. Those assembling separate designs may also be segregated, resulting potentially in an inefficient use of assembly workers.

The above problems have been contended with because the industry has not devised a design that will interface with multiple chassis configurations and that is practical from the standpoint of cost and integrity.

SUMMARY OF THE INVENTION

In one form, the invention is directed to the combination of a chassis and a cargo carrying container. The chassis has a first frame and a first twist lock assembly. The first twist lock assembly has a shaft with an enlarged head with a width and a length dimension. The enlarged head is mounted to the first frame for guided movement around a first axis. The cargo carrying container is mounted in an operative position upon the chassis. The cargo carrying container has a second frame and a second twist lock assembly that cooperates with the first twist lock assembly in a manner whereby the cargo carrying container is selectively: a) maintained against separation from the chassis where the first and second twist lock assemblies interact; and b) allowed to separate from the cargo carrying container where the first and second twist lock assemblies interact. The second twist lock assembly includes a slide plate with an aperture through which the enlarged head is passed in an axial direction with the enlarged head in an assembly/disassembly orientation. The first twist lock assembly and slide plate are configured so that the enlarged head in the assembly/disassembly orientation, when moved relative to the slide plate in a first axial direction, deflects the slide plate from a first position to allow the enlarged head to pass through the slide plate aperture. With this construction, at least one of: a) with the cargo carrying container in the operative position and the enlarged head passed through the slide plate aperture, the enlarged head is movable around the first axis from the assembly/disassembly orientation into a holding orientation, wherein the enlarged head is blocked from being withdrawn from the slide plate aperture by the slide plate; and b) as an incident of the cargo carrying container being moved from a separated position into the operative position, the enlarged head initially deflects the slide plate from the first position into a second position to allow the enlarged head to pass through the slide plate aperture, whereupon the enlarged head can be blocked by the slide plate from being withdrawn from the slide plate aperture.

In one form, with the cargo carrying container in the operative position and the enlarged head passed through the slide plate aperture and in the holding orientation, the enlarged head is blocked from being withdrawn from the slide plate aperture by the slide plate at diametrically opposite locations.

In one form, the combined chassis and cargo carrying container have a width. The first and second twist lock assemblies cooperate with each other at a first location. There are third and fourth twist lock assemblies, respectively on the first and second frames, that cooperate with each other at a second location in the same manner that the first and second twist lock assemblies cooperate with each other at the first location. The first and second locations are spaced widthwise from each other.

In one form, the second and fourth twist lock assemblies are configured to cooperate with the first and third twist lock assemblies with the first and third twist lock assemblies spaced from each other different widthwise distances.

In one form, the third twist lock assembly has a shaft with an enlarged head that moves around a second axis. The first and second axes are substantially parallel and spaced widthwise from each other. The twist lock assemblies are configured to cooperate with each other with the first and second axes spaced from each other a distance in at least a range of 89.0-92.75 inches.

In one form, the combined chassis and cargo carrying container have a front, a rear, and a width. The first and second twist lock assemblies are at the rear of the combined chassis and cargo carrying container. There are first and second lock pins on the front of the chassis that cooperate respectively with first and second apertures in the cargo carrying container to limit widthwise movement between the chassis and cargo carrying container. The first and second apertures are configured to cooperate with the first and second lock pins with the first and second lock pins spaced from each other different widthwise distances.

In one form, the combined chassis and cargo carrying container have a front and a rear. The first and second twist lock assemblies are at the rear of the combined chassis and cargo carrying container. There are first and second lock pins on the front of the chassis that cooperate respectively with first and second apertures in the cargo carrying container to limit widthwise movement between the chassis and cargo carrying container. The first and second apertures are configured to cooperate with the first and second lock pins with the first and second lock pins spaced from each other a distance in at least a range of 89.0-92.75 inches.

In one form, the combined chassis and cargo carrying container have a length, a width, a front and rear. The chassis has a gooseneck projection at the front of the combined chassis and cargo carrying container. The gooseneck projection has a first width between first and second spaced outer side walls. The cargo carrying container has a tunnel to receive the gooseneck projection. The tunnel has a width between first and second spaced inner side walls greater than the width of the gooseneck projection, so that with the cargo carrying container in the operative position there is a first widthwise gap between the first inner and outer side walls. The cargo carrying container further has an adaptor assembly with a first adaptor plate, movable relative to the second frame, that resides within the first gap.

In one form, the first adaptor plate is vertically and slidingly guided between a raised position and an operative position. The cargo carrying container is capable of accommodating a chassis with a gooseneck projection with a width greater than the first width by causing the first adaptor plate to be maintained in the raised position with the cargo carrying container in the operative position.

In one form, the adaptor plate moves under its own weight from the raised position into the operative position.

In one form, there is a second widthwise gap between the second inner and outer guide walls. The adaptor assembly further has a second movable adaptor plate that resides within the second gap. The second adaptor plate is vertically and slidingly guided between raised and operative positions.

In one form, with both of the adaptor plates in their raised positions the tunnel will accommodate the gooseneck with a width of up to 40 inches, and with the adaptor plates in their operative positions the tunnel will accommodate the gooseneck with a width of up to 32 inches.

In one form, the adaptor assembly is at the front of the combined chassis and cargo carrying container.

In one form, the slide plate is urged by a bias force toward the first position and the enlarged head deflects the slide plate against the bias force as the enlarged head moves in the first axial direction.

In one form, the slide plate is guided in translational movement within a slot.

In one form, the shaft moves as one piece with the enlarged head and is guided for movement around the first axis within a sleeve. The sleeve has an outer surface with a diameter approximately equal to or greater than the width of the enlarged head. The sleeve outer surface bears upon the plate and guides withdrawal of the enlarged head through the slide plate aperture with the enlarged head in the assembly/disassembly orientation.

In one form, the first twist lock assembly includes an aperture plate that guides movement of the slide plate. The aperture plate has a fully surrounded aperture with an area larger than an area of the slide plate aperture.

In one form, the slide plate has a substantially flat body with a first transverse arm and there is a biasing mechanism that acts against the first arm and thereby resiliently urges the slide plate into its first position.

In one form, the slide plate is resiliently urged into its first position.

In one form, the slide plate is resiliently urged into its first position by forces that act in opposite directions upon the slide plate.

BRIEF DESCRIPTION OF THE DRAWINGS

FIG. 3 is a plan view of a conventional chassis with laterally spaced twist lock assemblies at the rear thereof and laterally spaced lock pins at the front thereof;

FIG. 4 is an enlarged, fragmentary, cross-sectional, side elevation view of the front of the chassis frame in FIG. 3 and showing a gooseneck formed thereon;

FIG. 42 is a fragmentary, front elevation view of the front portion of an inventive cargo carrying container with the adaptor assemblies cooperating with a "standard" gooseneck configuration on a chassis; and FIG. 43 is a view as in FIG. 42 wherein the gooseneck has a non-standard/modified configuration with a modified/narrower width.

DETAILED DESCRIPTION OF THE PREFERRED EMBODIMENT

Figure 1:
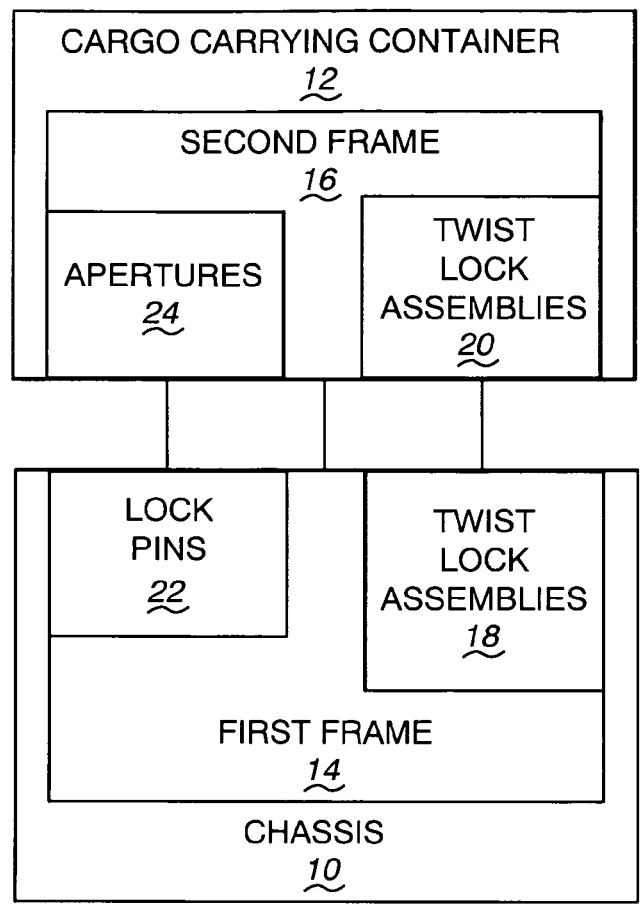
FIG. 1 is a schematic representation of a combined cargo carrying container and chassis, according to the present invention, with cooperating: a) lock pins and apertures; and b) twist lock assemblies that releasably maintain the cargo carrying container in an operative position upon the chassis.

In FIG. 1, a combination of the main components of the present invention is shown in schematic form, consisting of a chassis 10 and a cargo carrying container 12. The chassis 10 has a first frame 14 that supports a second frame 16 on the cargo carrying container 12. Cooperating twist lock assemblies 18, 20 are respectively provided on the chassis 10 and second frame 16 at the rear of the combined cargo carrying container 12 and chassis 10. The twist lock assemblies 20 are provided on the underside of the second frame 16 at locations spaced from each other in a lateral/widthwise direction. Lock pins 22 are provided on the first frame 14 at locations spaced in a lateral/widthwise direction to cooperate, one each, with apertures 24 on the second frame 16.

The chassis 10 and cargo carrying container 12 are shown in schematic form in that the showing is intended to encompass virtually a limitless number of variations of the depicted components, contemplated by the present invention. For example, the nature, configuration, and dimensions of the cargo carrying container 12 are not critical to the present invention. While it is generally contemplated that the cargo carrying container 12 will be a "closed van" container with an enclosed cargo storage space, this is not a requirement.

Further, the chassis 10 may be one with a wheeled undercarriage or one that is otherwise adapted for over-the-road movement, stacking, storage, etc. The inventive concept is not dependent upon any particular details of these components.

Figure 2:
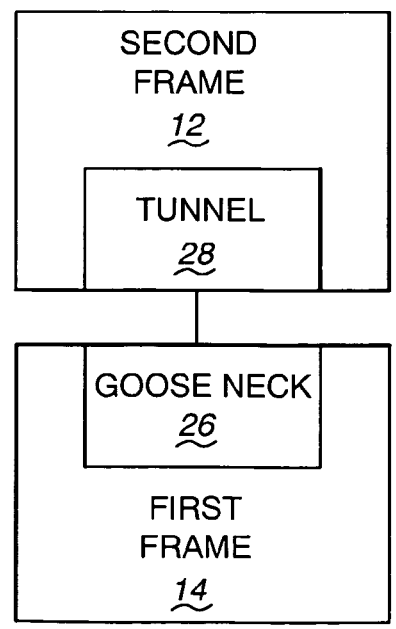
FIG. 2 is a schematic representation of a cooperating gooseneck and tunnel, respectively on a first frame on the chassis and a second frame on the cargo carrying container.
Figure 5:
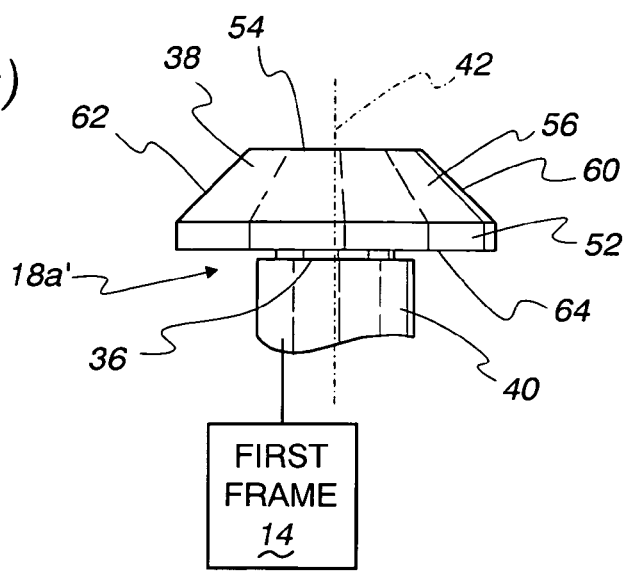
FIG. 5 is an enlarged, fragmentary, side elevation view of a portion of one of the twist lock assemblies on the chassis of FIG. 3, including an enlarged head supported on a shaft.

As shown in FIG. 2, the invention further contemplates that the first frame 14 may include a gooseneck 26 that is received in a tunnel 28 on the second frame 16. The basic gooseneck and tunnel designs are well known to those skilled in the art.

In FIGS. 3-9, one specific, conventional form of the components as shown in FIGS. 1 and 2 is depicted, with corresponding components in these Figs. Identified with the same reference numeral plus a "'" designation.

The chassis 10' is shown with the frame 14', absent any bed or container. The frame 14' has a wheeled undercarriage 30 at the rear thereof. A front bolster 32 supports lock pins 22a', 22b'. The lock pins 22a', 22b' are spaced from each other in a widthwise/lateral direction and each projects in cantilever fashion in a rearward direction from the front bolster 32.

Twist lock assemblies 18a', 18b' are provided on a laterally extending beam 34 at the rear of the frame 14'. The lateral, center spacing S, S1, respectively between the lock pins 22a', 22b' and twist lock assemblies 18a', 18b', is the same.

The exemplary twist lock assembly 18a' consists of a shaft 36 with an enlarged head 38 at the upper end of the shaft 36. The shaft 36 is guided within a sleeve 40 for movement around a vertical axis 42. The shaft 36 and enlarged head 38 move as one piece around the axis 42.

To secure the second frame 16' to the first frame 14', the second frame 16' is lowered onto the first frame 14' with the lock pins 22a', 22b' aligned widthwise, one each, with the apertures 24a' (one shown). By shifting the second frame 16' forwardly, the lock pins 22a', 22b' are directed into the apertures 24a', as seen most clearly in FIGS. 7-9.

Exemplary aperture 24a' has a generally oval cross-sectional area. The lock pin 22a' has a polygonal cross-sectional shape that is nominally matched to the area of the aperture 24a', but sufficiently smaller to allow it to be press fit into the aperture 24a' without interference. With the lock pin 22a' in the aperture 24a', the outer surface 46 of the lock pin 22a' and surface 48 surrounding the aperture 24a' cooperate to limit relative vertical and widthwise movement between the frames 14', 16' at the front region of the combined chassis 10' and cargo carrying container 12' where these components interact.

The twist lock assemblies 18a', 18b' cooperate in like fashion, one each, with twist lock assemblies 20a' (one shown) on the second frame 16'. The exemplary twist lock assembly 18a' has an aperture 50 that is generally obround with a length L and width W. The aperture 50 is nominally matched to the shape of the enlarged head 38, as viewed along the axis 42. The enlarged head 38 has corresponding length L1 and width W1 dimensions.

The enlarged head 38 has a bottom rim 52 with a uniform length and width dimension over its axial/vertical extent. The enlarged head 38 tapers progressively fully around its perimeter to a flat top surface 54. More specifically, there are like flat surfaces 56, 58 that extend from the rim 52 to the top surface 54, along the length dimension of the enlarged head 38, and like flat surfaces 60, 62 that extend from the rim 52 to the top surface 54, along the width dimension of the enlarged head 38.

Figure 6:
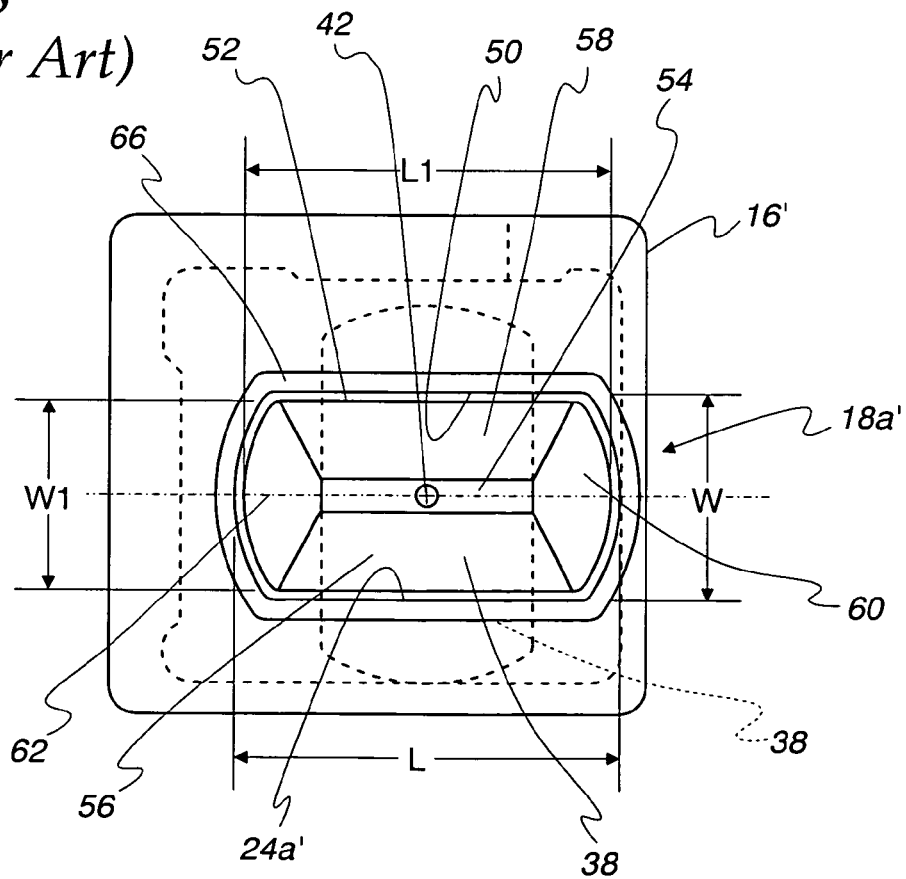
FIG. 6 is an enlarged, fragmentary, plan view of a twist lock assembly on a cargo carrying container, that cooperates with the twist lock assembly on the chassis shown in FIG. 3, and with the enlarged head shown in an assembly/disassembly orientation in solid lines and in a holding orientation in dotted lines.
Figure 7:
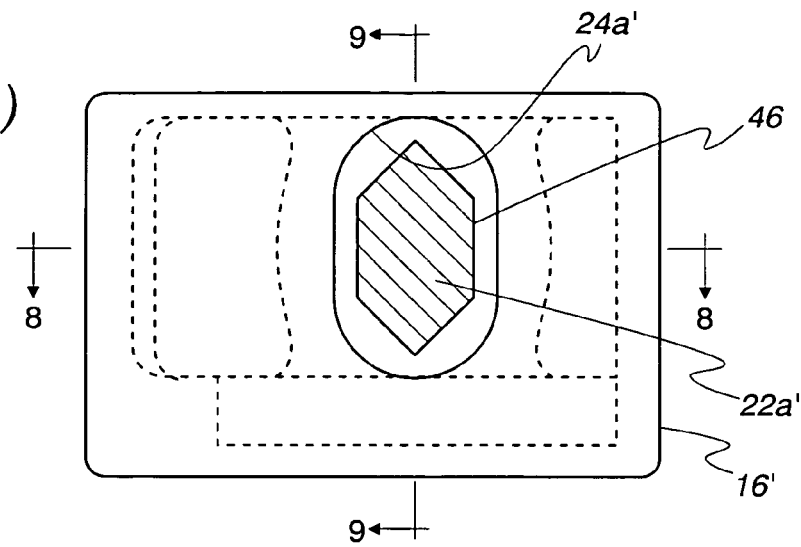
FIG. 7 is an enlarged, fragmentary, front elevation view of one of the apertures on the cargo carrying container with which the twist lock assembly of FIG. 6 is associated, and with one of the lock pins directed thereinto and shown in cross-section.
Figure 8:
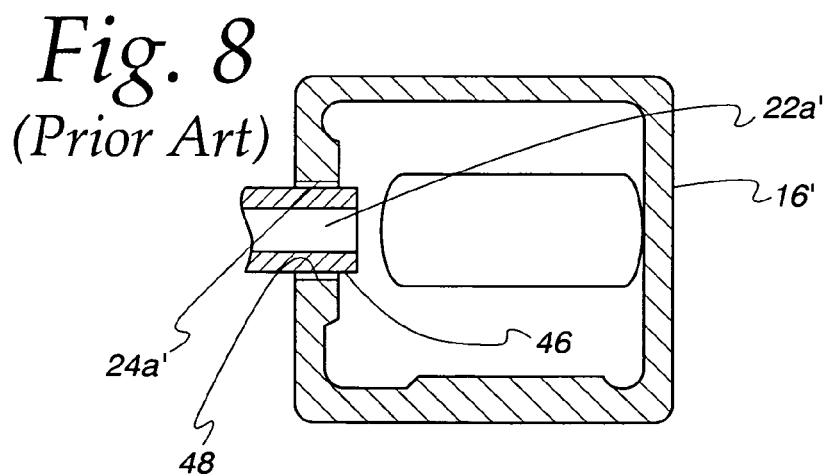
FIG. 8 is a cross-sectional view of the components in FIG. 7 with the lock pin extended into the aperture therein and taken along line 8-8 of FIG. 7.
Figure 9:
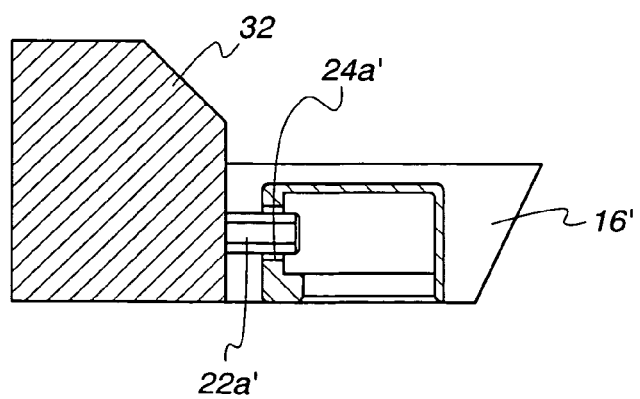
FIG. 9 is an enlarged, fragmentary, cross-sectional view of the components in FIG. 7 taken along line 9-9 therein.

As the cargo carrying container 12' is lowered from a separated position onto the chassis 10', with the enlarged head 38 in an assembly/disassembly orientation, wherein the length L1 and width W1 dimensions thereof are aligned with the corresponding length L and width W dimensions of the aperture 50, as shown in solid lines in FIG. 6, the enlarged head 38 is passed axially through the aperture 50 until the bottom surface 64 of the enlarged head 38 resides above an upwardly facing surface 66 on the beam 34. Once this state is realized, the enlarged head 38 and shaft 36 can be turned around the axis 42 through 90 degrees to thereby place the enlarged head 38 in a holding orientation, shown in dotted lines in FIG. 6. The enlarged head 38 is thus blocked from being withdrawn at diametrically opposite locations by the frame surface 66.

The twist lock assembly 18b' cooperates with the frame 16' in the same manner at its location, spaced widthwise from the location of the twist lock assembly 18a'.

Also depicted in FIGS. 3 and 4 is the aforementioned gooseneck 26' at the front of the frame 14'. The gooseneck 26' is vertically offset upwardly a distance O from the remainder of the frame 14'.

Figure 10:
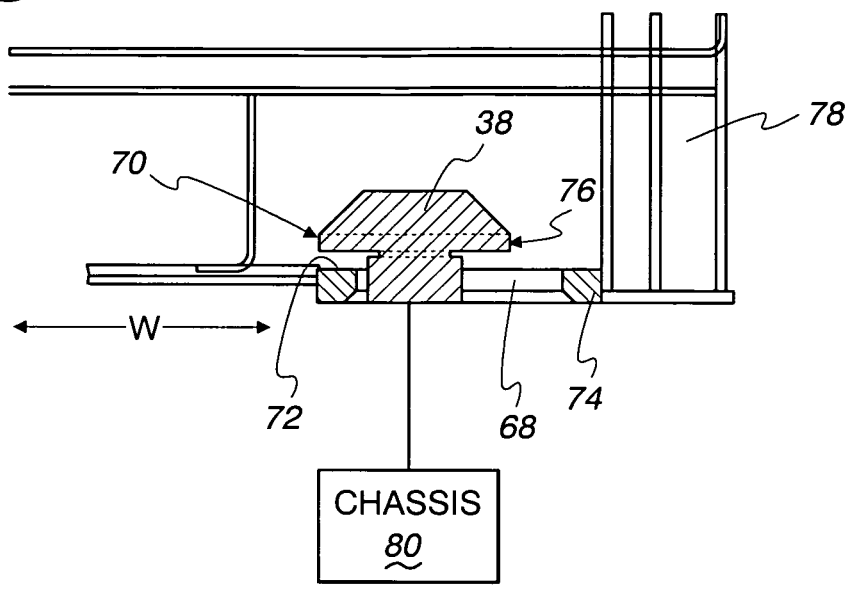
FIG. 10 is a fragmentary, cross-sectional view of a hypothetical construction wherein an enlarged head, as shown in FIG. 5, is directed through a container aperture that is oversized to accommodate one particular chassis construction, wherein the twist lock assemblies have one widthwise spacing, and with the enlarged head in a holding orientation.
Figure 11:
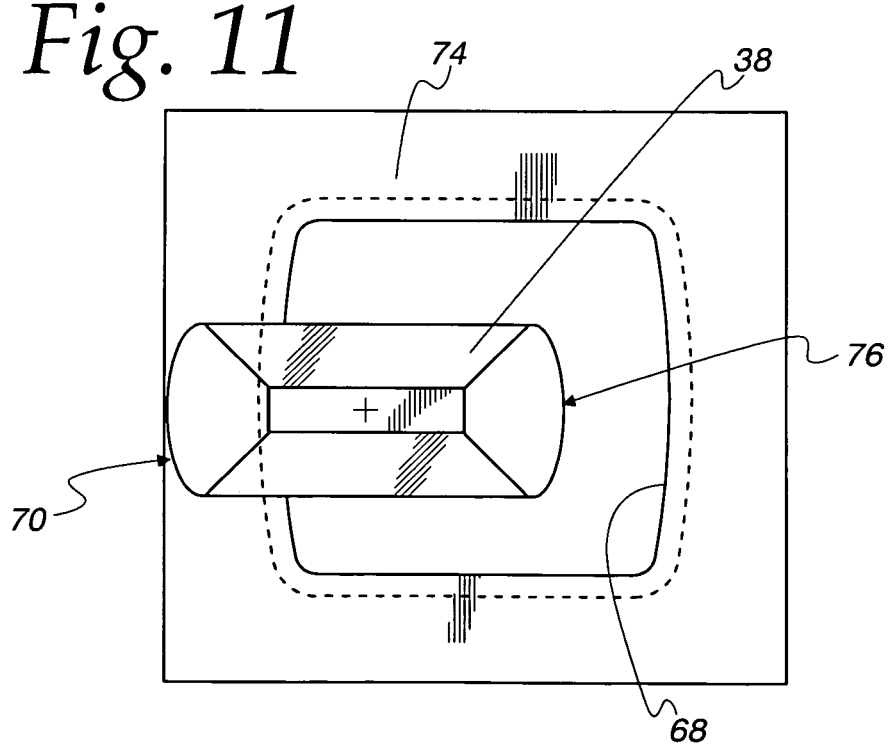
FIG. 11 is an enlarged, plan view of the twist lock assembly in FIG. 10.

In FIGS. 10 and 11, a hypothetical modified structure is shown wherein an aperture 68, corresponding to the aperture 50, is enlarged in a widthwise direction, as indicated by the double-headed arrow W, to accommodate chassis wherein the twist lock assemblies thereon may have different widthwise spacing. With the enlarged head 38 in the holding position in FIGS. 10 and 11, one lengthwise end 70 is blocked by an upwardly facing surface 72 on an aperture plate 74.

The other lengthwise end 76 of the enlarged head 38 has no blocking structure therebeneath. Thus, a force tending to vertically separate the container 78 from the chassis 80 is resisted entirely only by the one end 70. As a result, the lack of vertical restraint on the other end 76 makes possible unsafe loading upon the head 38, which could skew components and/or cause the head 38 to bend or fully separate. This condition is particularly likely to occur when the container 78 and chassis 80 are lifted together, as to be placed on rail cars or otherwise repositioned. Even if these components themselves do not fail, the construction in FIGS. 10 and 11 is likely to allow the associated cargo carrying container and chassis to shift relative to each other a significant amount in use to an extent that other components move/skew and are thereby prone to being damaged. Such a structure would not likely meet industry regulatory standards limiting such component shifting.

One specific form of the invention, as shown schematically in FIG. 1, is depicted in detail in FIGS. 12-27.

Figure 13:
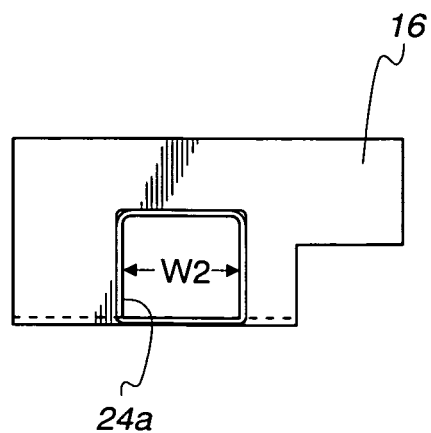
FIG. 13 is an enlarged, fragmentary, front elevation view of the inventive cargo carrying container and showing one of the apertures for one of the lock pins.
Figure 14:
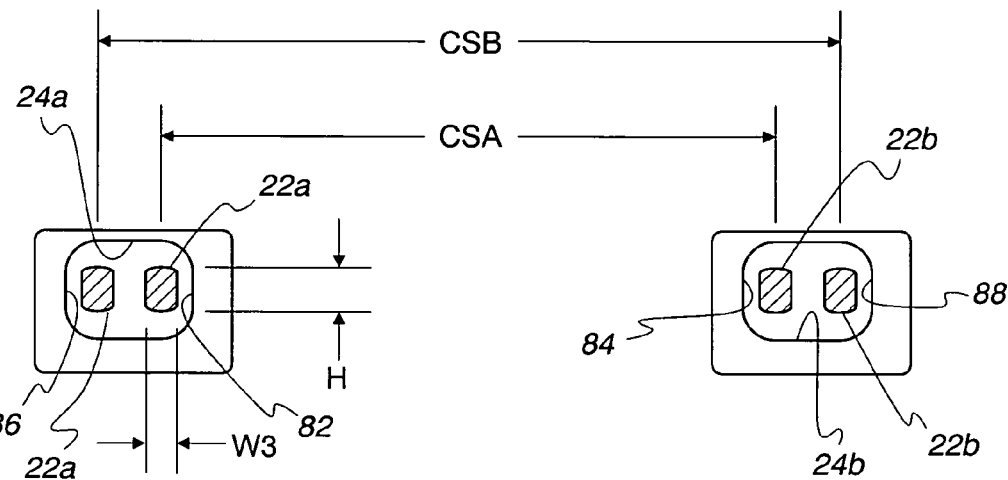
FIG. 14 is a view as in FIG. 13 with lock pin pairs shown in the apertures therefor and with the lock pin pairs at different center spacing.

The front apertures 24a, 24b on the frame 16 on the cargo carrying container 12 have an enlarged lateral width W2, shown for exemplary aperture 24a in FIG. 13. The width W2 is on the order of 4 inches. The apertures 24a, 24b are spaced so that the paired lock pins 22a, 22b will reside in the apertures 24a, 24b, respectively, with the lock pin centers spaced a "standard" 89 inches, as identified as CSA in FIG. 14, and with the non-standard/modified center spacing of 92.75 inches, indicated as CSB in that same Figure.

Each lock pin 22a, 22b will typically have a height H on the order of 1½ inches, with a width W3 on the order of one inch. The apertures 24a, 24b are located so that with the lock pins 22a, 22b having the standard 89 inch center spacing, the pins 22a, 22b reside adjacent to laterally outwardly facing surfaces 82, 84 bounding the apertures 24a, 24b. Shifting of the container 12 in one lateral direction is limited by the interaction of the lock pin 22a with the surface 82, with lateral shifting in the opposite direction limited by the interaction of the lock pin 22b with the surface 84.

With the lock pins 22a, 22b having the non-standard/modified center spacing of 92.75 inches, the lock pins 22a, 22b reside adjacent to laterally inwardly facing surfaces 86, 88, bounding the apertures 24a, 24b, respectively. Lateral shifting of the container 12 in one direction is limited by the interaction of the lock pin 22a with the surface 86, with lateral opposite shifting limited by interaction of the lock pin 22b with the surface 88, as shown also in FIG. 16.

Figure 12:
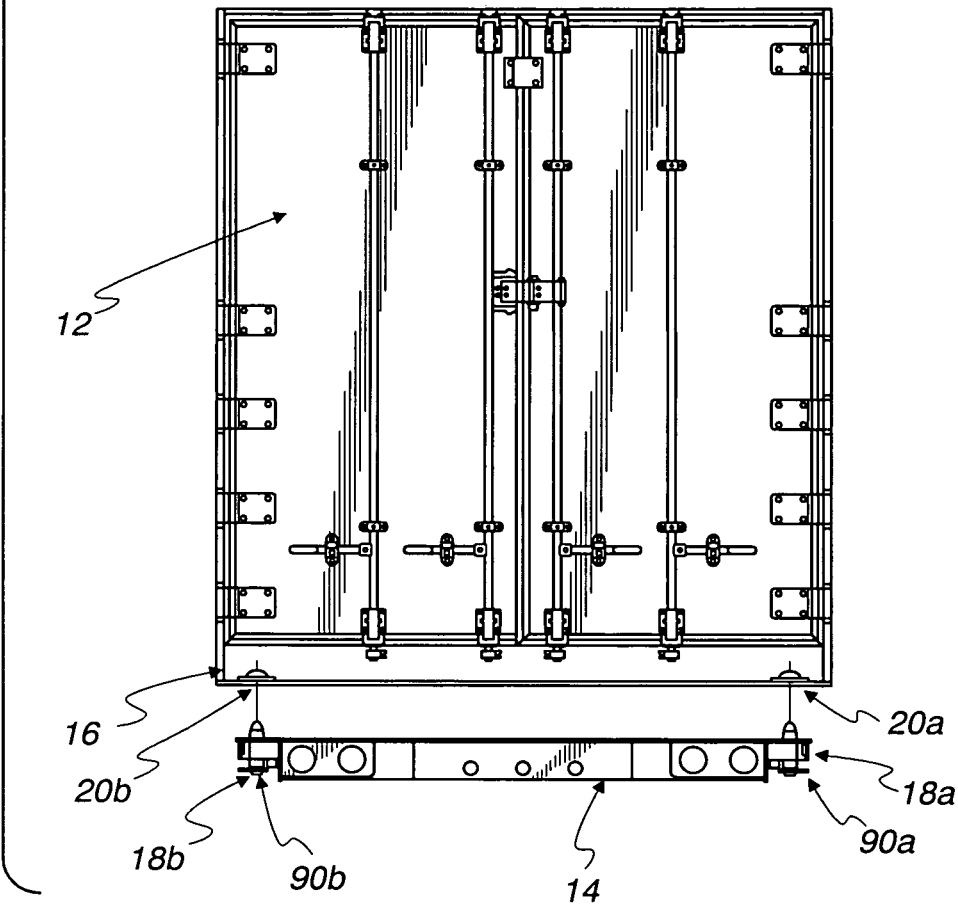
FIG. 12 is a rear elevation view of one exemplary form of the inventive cargo carrying container, as shown in FIGS. 1 and 2, in spaced relationship to a chassis, as also shown in FIGS. 1 and 2, with cooperating twist lock assemblies shown on the cargo carrying container and chassis.

The twist lock assemblies 18a, 18b may be the same as the twist lock assemblies 18a', 18b', described above. For purposes of the description herein, the twist lock assemblies 18a, 18b will be treated as the same as the aforementioned twist lock assemblies 18a', 18b', with corresponding parts identified with the same reference numerals. In FIG. 12, conventional actuators 90a, 90b are shown respectively to hand operate the twist lock assemblies 18a, 18b, respectively.

The twist lock assemblies 20a, 20b on the frame 16 on the container 12 have the same construction and thus detailed description herein will be limited to the exemplary twist lock assembly 20a.

The twist lock assembly 20a consists of an aperture plate 92 with a fully surrounded, "double width" through aperture 94 and a slide plate 96 with a "single" through aperture 98. The "single" aperture has the typical ISO standard aperture configuration.

Figure 17:
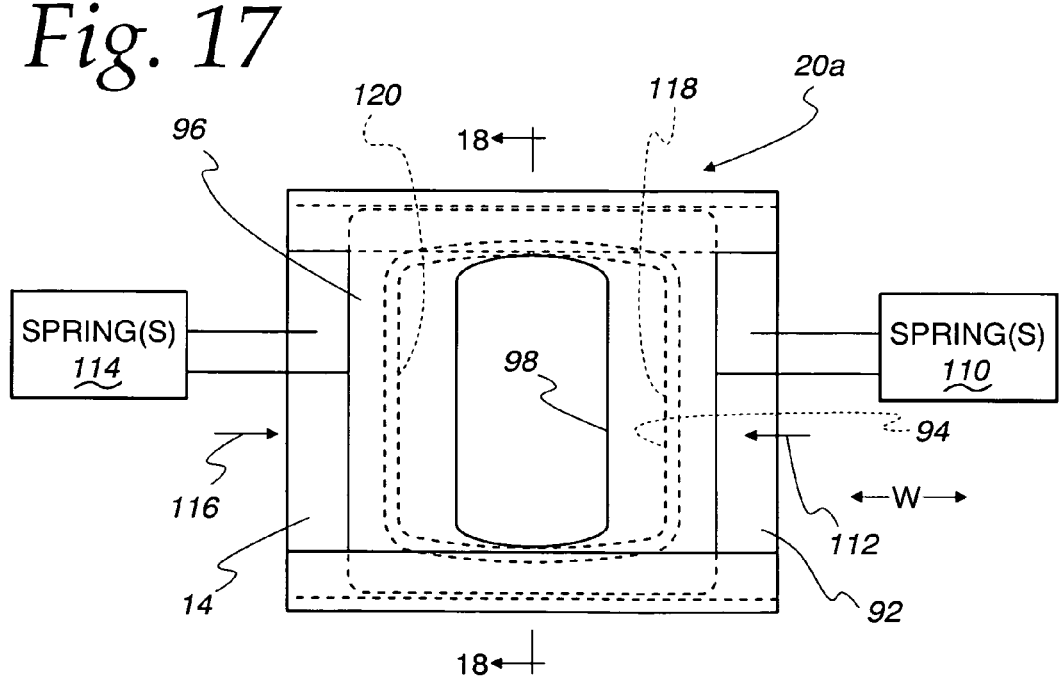
FIG. 17 is an enlarged, plan view of one of the twist lock assemblies on the inventive cargo carrying container.
Figure 18:
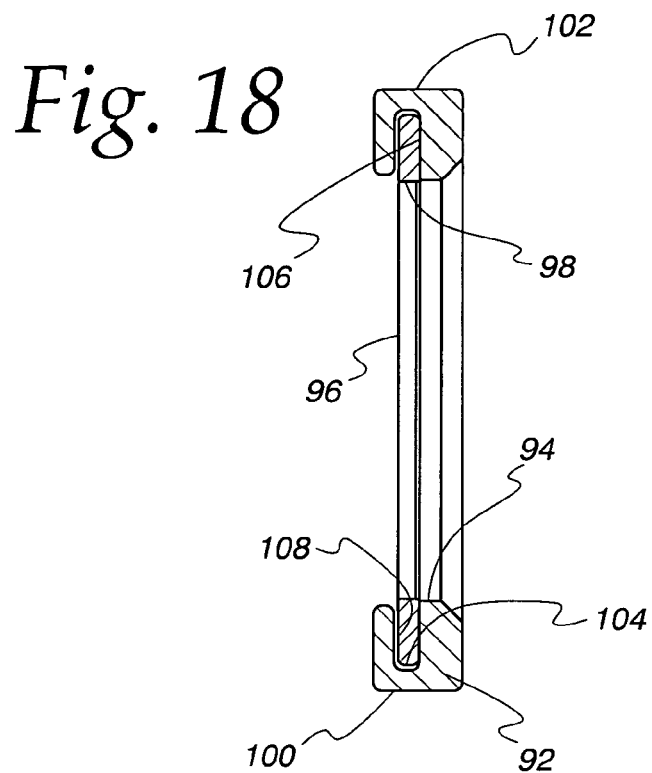
FIG. 18 is an enlarged, cross-sectional view of the twist lock assembly taken along line 18-18 of FIG. 17.
Figure 19:
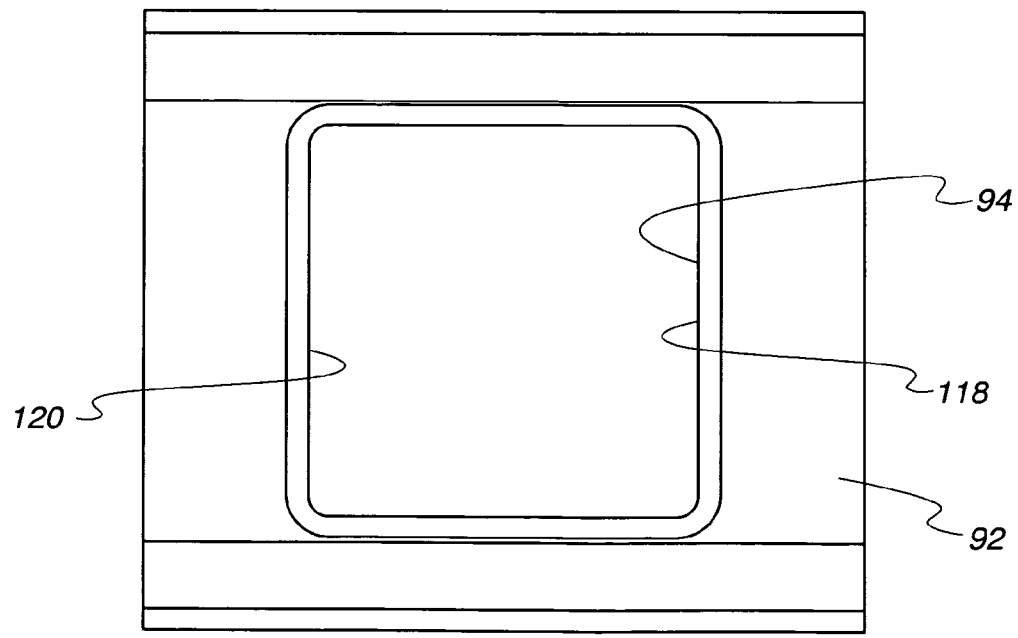
FIG. 19 is an enlarged, plan view of an aperture plate on the twist lock assembly in FIG. 17.
Figure 20:
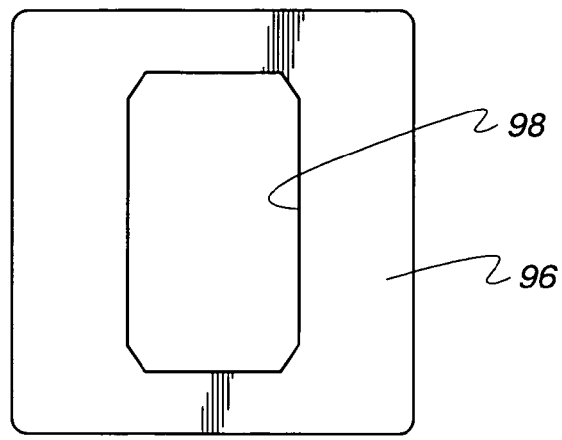
FIG. 20 is an enlarged, plan view of a slide plate that moves guidingly within a slot on the aperture plate of FIG. 19.

The aperture plate 92 has spaced walls 100, 102 with elongate, respectively with U-shaped grooves 104, 106 opening towards each other and cooperatively defining a slot 108 in which the slide plate 96 is guided in movement in a widthwise direction, as indicated by the double-headed arrow W in FIG. 17.

At least one spring 110 makes up part of a biasing mechanism and acts between the aperture plate 92, that is part of the frame 14, and the slide plate 96, to biasably urge the slide plate 96 laterally in the direction of the arrow 112 in FIG. 17. The biasing mechanism includes a similar arrangement of one or more springs 114 that act between the frame 14 and slide plate 96 to exert an opposing bias force in the direction of the arrow 116. The springs 110, 114 normally resiliently urge the slide plate 96 to a first, neutral position, as seen in FIG. 17, substantially centered between spaced edges 118, 120 of the aperture 94.

While reference is made to "springs" 110, 114, any biasing structure that resiliently centers the slide plate 96 and allows it to be deflected away from the first position under a predetermined force, can be utilized in the construction and is considered to be a "spring", as used herein.

Figure 21:
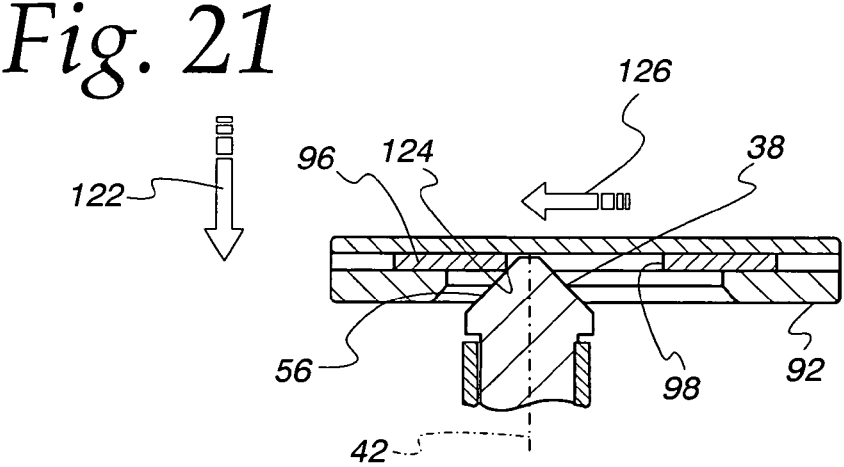
FIG. 21 is an enlarged, cross-sectional view of the twist lock assembly in FIG. 17 and with an enlarged head on a cooperating twist lock assembly on the "standard" form of chassis being directed into an aperture on the slide plate.
Figure 22:
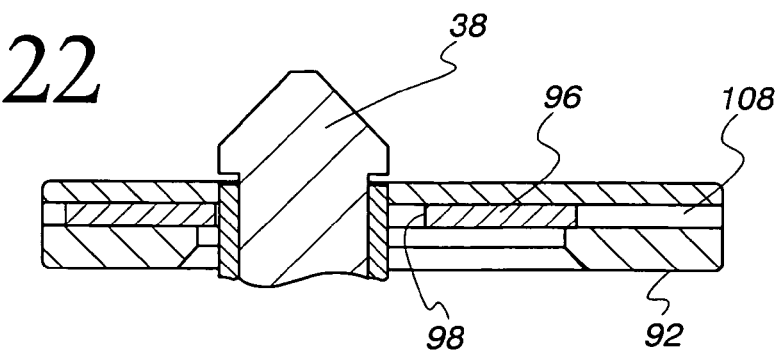
FIG. 22 is a further enlarged view as in FIG. 21 wherein the enlarged head has been directed fully through the slide plate aperture.
Figure 23:
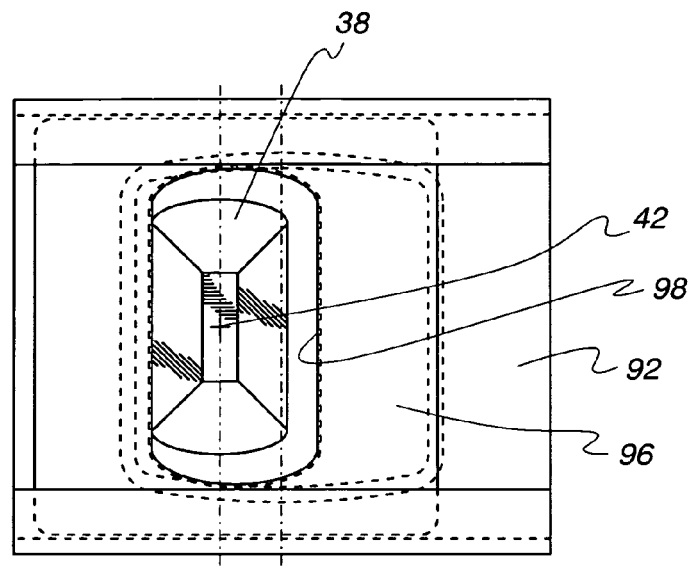
FIG. 23 is an enlarged, plan view of the twist lock assembly and enlarged head in the FIG. 22 state.

With the "standard" locations of the twist lock assembly 20a, as the container 12, initially fully separated from the chassis 10, is directed downwardly relative thereto substantially parallel to the axis 42, as indicated by the arrow 122 in FIG. 21, the surface 56 on the enlarged head 38 encounters an edge 124 on the slide plate 96 around the aperture. Continued downward movement of the container 12 causes the surface 56 to cam the edge 124, and thus the slide plate 96, laterally in the direction of the arrow 126 in FIG. 21. This camming action continues until the enlarged head 38, in the assembly/disassembly orientation, fully registers with the opening 98 and passes fully therethrough, as shown in FIGS. 22 and 23.

Figure 24:
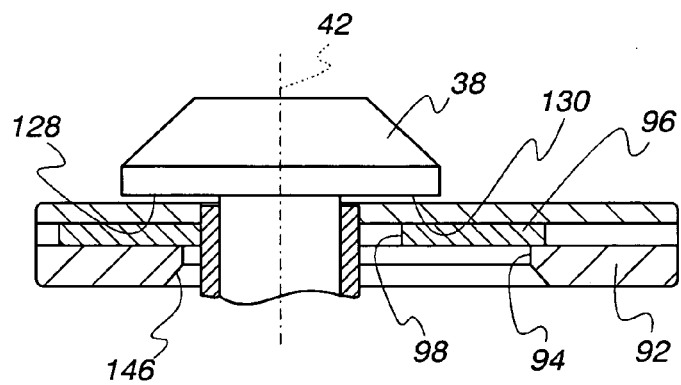
FIG. 24 is a view as in FIG. 22 wherein the enlarged head has been turned from an assembly/disassembly orientation into a holding orientation.
Figure 25:
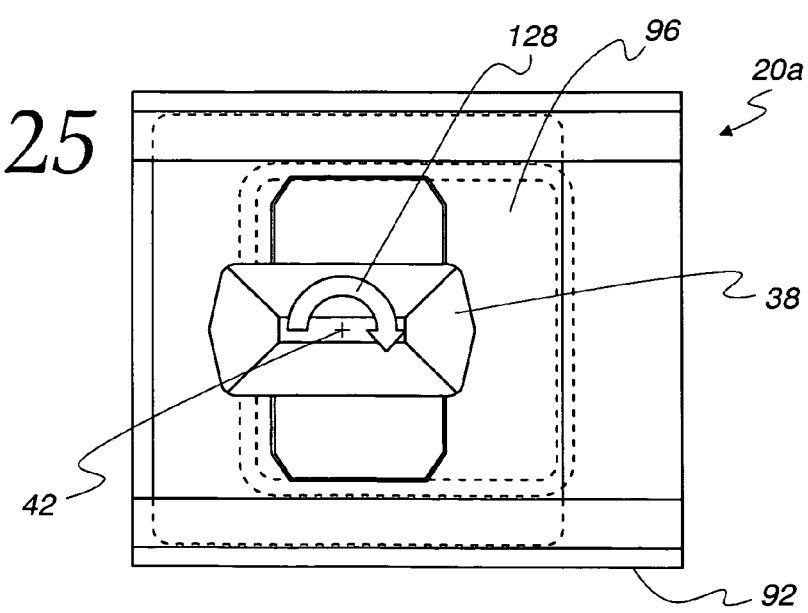
FIG. 25 is an enlarged, plan view of the enlarged head and twist lock assembly in the FIG. 24 state.

The enlarged head 38 and associated shaft 36 can then be turned 90 degrees, in the direction of the arrow 128 in FIG. 25 around the axis 42, into a holding orientation, as shown in FIGS. 24 and 25. In this orientation, downwardly facing surfaces 128, 130 on the enlarged head 38 face the slide plate 96 at diametrically opposite locations. Thus, the enlarged head 38 is blocked by the slide plate 96 from being withdrawn from the aperture 98.

Figure 26:
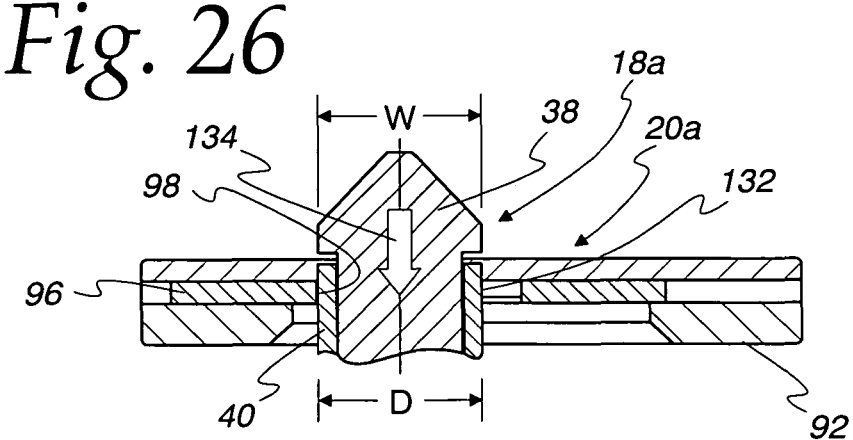
FIG. 26 is a view as in FIG. 24 wherein the enlarged head has been placed back into the assembly/disassembly orientation to allow separation of the cargo carrying container.

For the container 12 to be separated, the enlarged head 38 must be turned back into the assembly/disassembly orientation, as shown in FIG. 26. As can be seen in this Figure, the sleeve 40 has an outer surface 132 with a diameter D that is equal to, or slightly greater than, the width W of the enlarged head 38. Accordingly, with the container 12 in the operative position upon the chassis 10, the sleeve outer surface 132 maintains the slide plate 96 in a shifted lateral orientation, thereby allowing the enlarged head 38 to move in the direction of the arrow 134 to be withdrawn from the opening 98, and thus permitting separation of the container 12 from the chassis 10 at this location.

Figure 27:
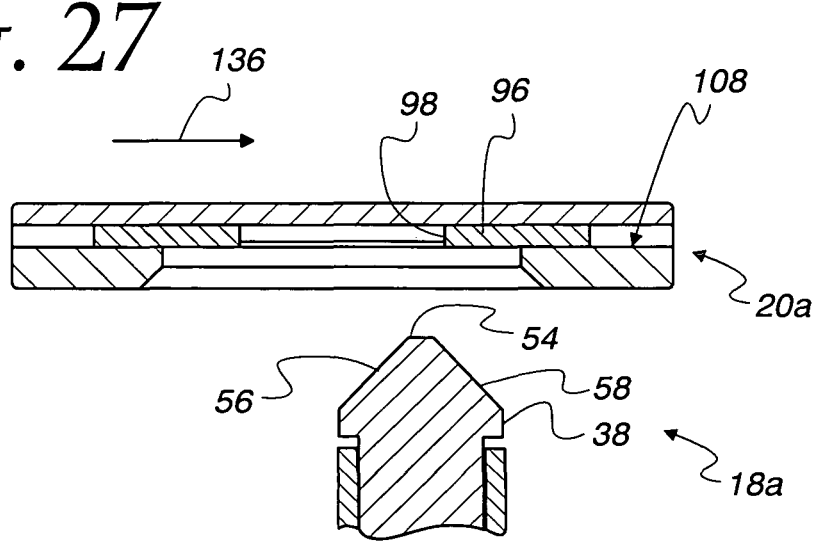
FIG. 27 is a view as in FIG. 21 wherein the enlarged head is on a chassis with a non-standard/modified configuration and wherein the twist lock assemblies on the chassis are spaced further from each other than those in FIG. 21.

As shown in FIG. 27, the twist lock assembly 20a cooperates with the twist lock assembly 18a in substantially the same manner with the twist lock assembly 18a having the spacing of the non-standard/modified design. The only significant difference is that the slide plate 96 is cammed by the head surface 58 in the opposite lateral direction, as indicated by the arrow 136 in FIG. 27, to allow the enlarged head 38 to register with, and pass through, the slide plate aperture 98.

Figure 28:
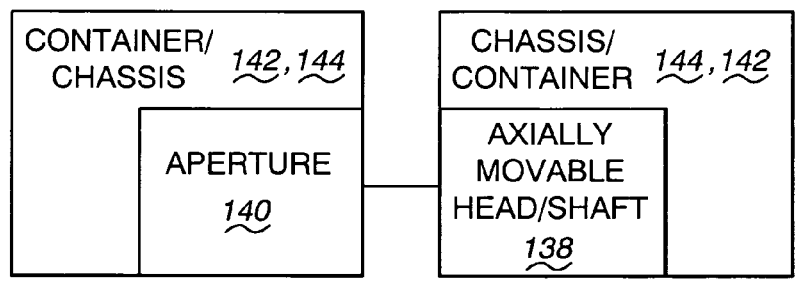
FIG. 28 is a schematic representation of a head/shaft on a twist lock assembly on one of a chassis and cargo carrying container that cooperates with an aperture on the other of the cargo carrying container and chassis.

It is normally contemplated that the enlarged head 38 and shaft 36 have a substantially fixed axial position within the sleeve 40, as in the standard construction. However, the invention could be practiced by constructing a twist lock assembly with a shaft and enlarged head that are shifted axially and turned to place the enlarged head in the holding orientation after the container 12 is placed in the operative position upon the chassis 10. This construction is shown schematically in FIG. 28 wherein the axially movable head/shaft 138 is shown to cooperate with an aperture 140. FIG. 28 is also intended to encompass, for all embodiments, constructions wherein the apertures 140 and cooperating heads/shafts 138 could be on either of a container 142 or chassis 144.

To prevent hangup between the enlarged head 38 and the aperture plate 92 as the cargo carrying container 12 is lowered onto the chassis 10, the aperture 94 therethrough has a stepped diameter. As seen in FIG. 24, the aperture 94 has a portion at 146 with a diameter that enlarges from bottom to top, thereby to deflect the enlarged head 38 laterally to a location wherein it can pass through the aperture 94.

A modified form of the twist lock assembly 20*a* is shown at 148 in FIGS. 29-32. The twist lock assembly 148 operates in substantially the same manner as the twist lock assembly 20*a*, with the primary distinction being a difference in configuration of the slide plate 96', corresponding to the slide plate 96 on the twist lock assembly 20*a*.

The slide plate 96' is guided within a slot 108' defined by an aperture plate 92 that has a "double width" aperture 94. The slide plate 96' has a flat body 152 that moves guidingly within the slot 108'. First and second arms 154, 156 are formed integrally with the flat body 152 and project away therefrom to be in transverse relationship therewith. The flat body 152 and arms 154, 156 may be formed as one piece and cooperatively define an upwardly opening "U" shape. The tops 158, 160 of the arms 154, 156, respectively, are inwardly offset towards each other and thereat define bearing surfaces 162, 164 that are acted upon by one or more biasing components 166, that are part of a biasing mechanism, and perform the function of the aforementioned springs 110, 114. In this embodiment, two of the biasing components 166 act against each of the surfaces 162, 164. Each of the components 166 is mounted upon a depending part of a bracket 168 and has a spring loaded plunger 170 that acts directly against the bearing surfaces 162, 164.

The flat body 152 has a standard ISO aperture 98. The aperture 98 is registrable with the enlarged head 38 through cammed shifting of the slide plate 96' in substantially the same manner as with the twist lock assembly 20*a*.

Figure 29:
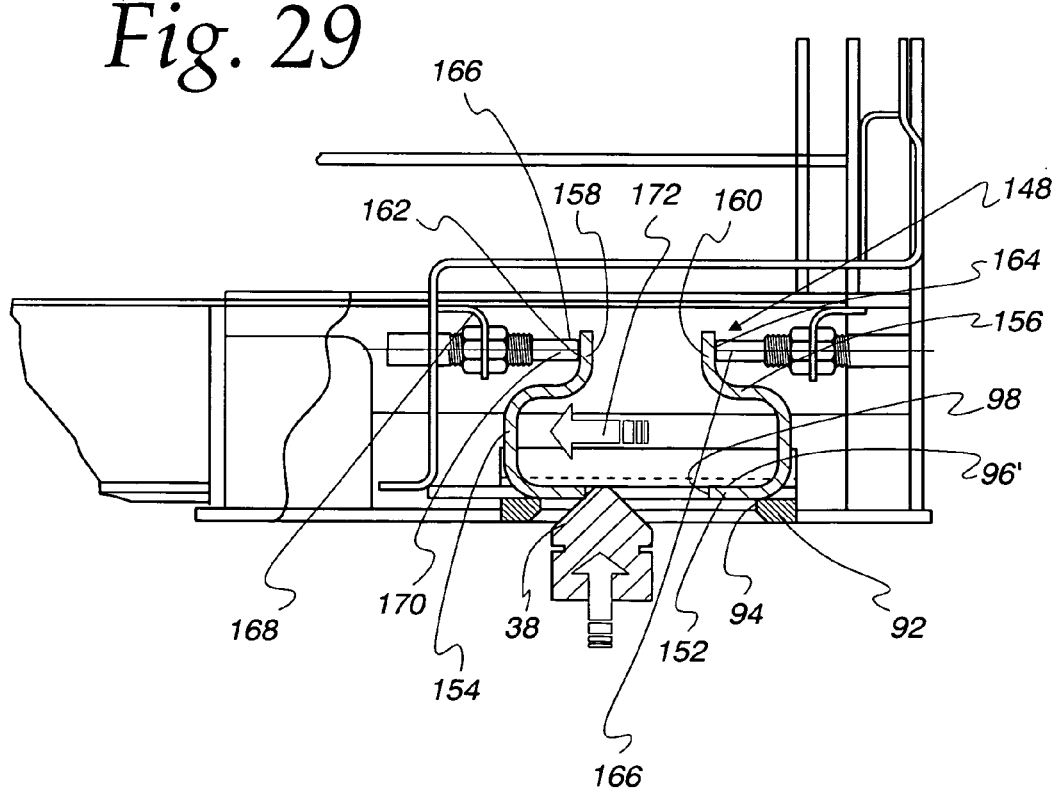
FIG. 29 is a view as in FIG. 21 through a cutout in a cargo carrying container and showing a modified form of the inventive slide plate.
Figure 30:
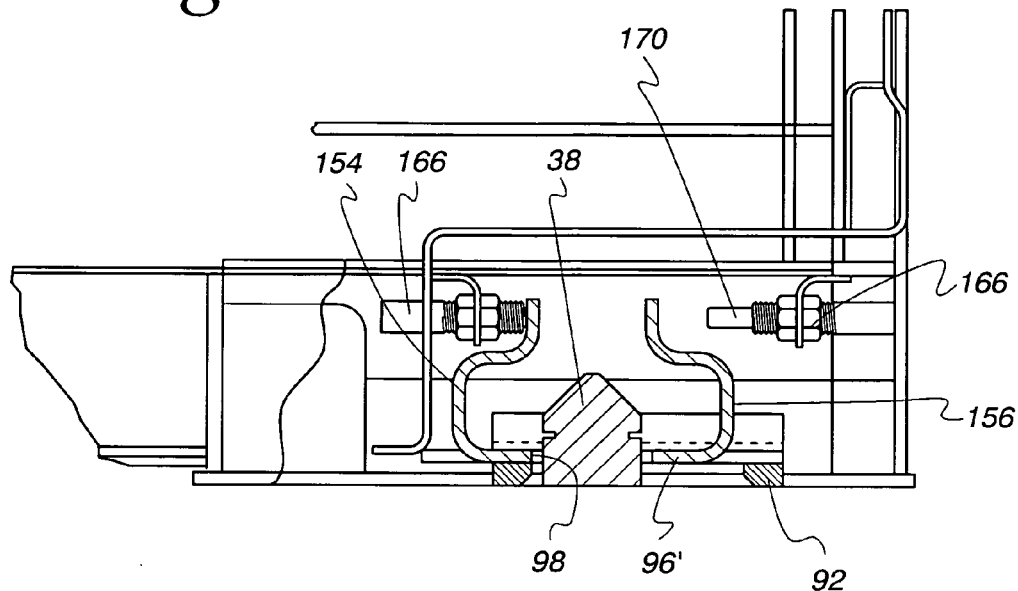
FIG. 30 is a view as in FIG. 29 wherein an enlarged head has been directed through an aperture in the slide plate.
Figure 31:
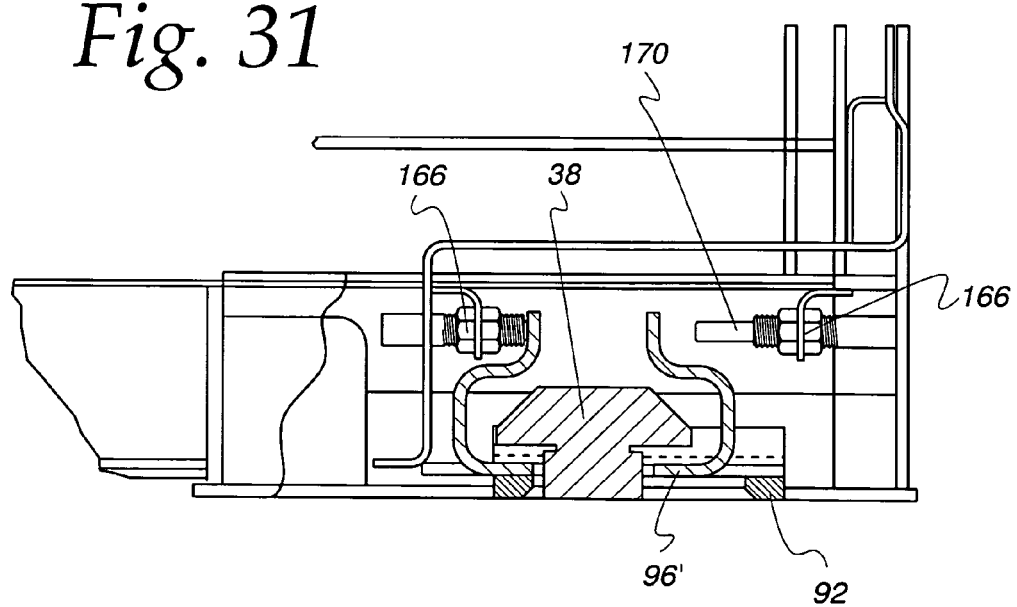
FIG. 31 is a view as in FIG. 30 wherein the enlarged head has been turned from the assembly/disassembly orientation in FIG. 30 into a holding orientation.
Figure 32:
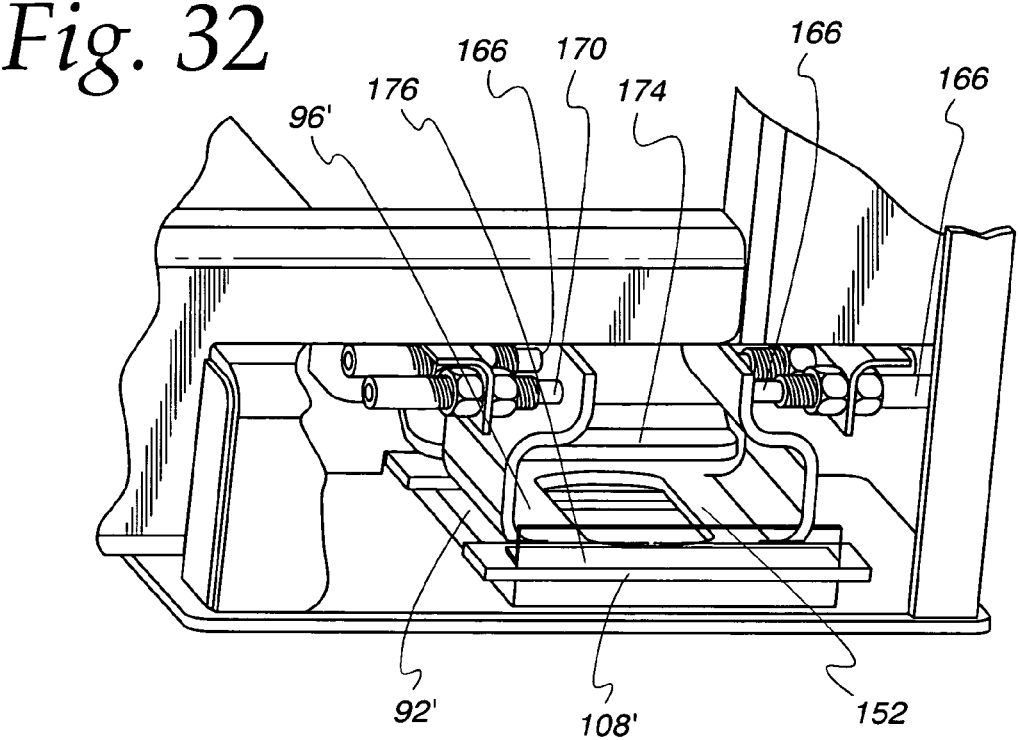
FIG. 32 is a fragmentary, perspective view of the twist lock assembly in FIGS. 29-31.

More specifically, as the container 12 is moved from a separated position towards its operative position, the enlarged head 38, with the standard ISO spacing, shifts the slide plate 96' laterally inwardly, as indicated by the arrow 172 in FIG. 29, eventually to the FIG. 30 position, in the process pressing in the plungers 170 acting upon the arm 154. Once the enlarged head 38 has passed through the apertures 94, 98, as shown in FIG. 30, the enlarged head 38 can be turned to the holding orientation, as shown in FIG. 31.

In this embodiment, the slot 108' is axially defined between the aperture plate 92 and separate and spaced, overlying angle members 174, 176, as opposed to being bounded by one piece, as in the prior embodiment.

Figure 33:
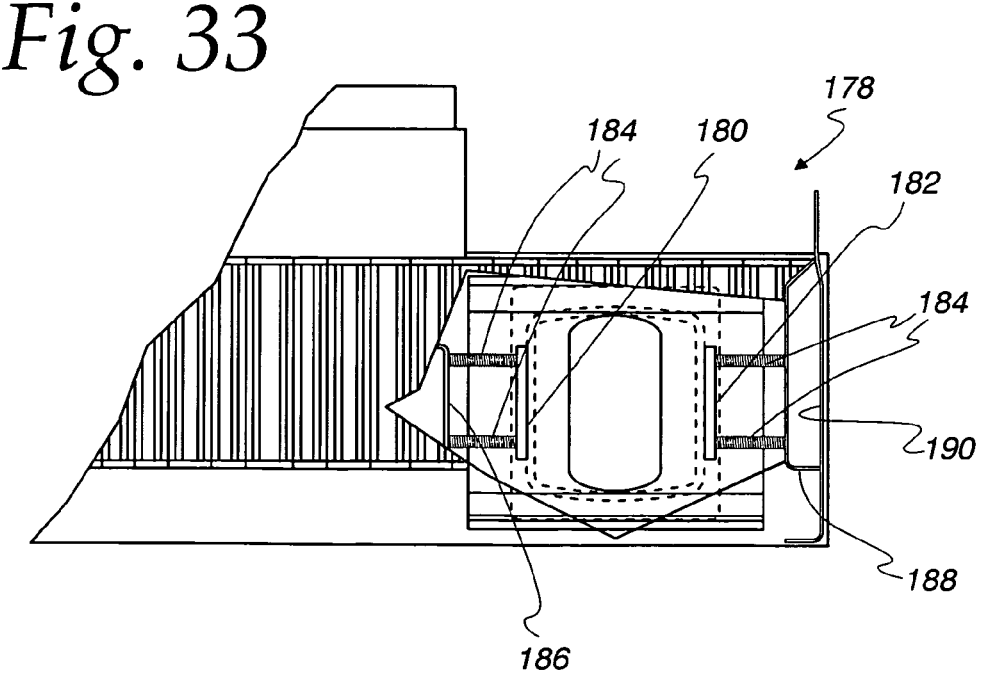
FIG. 33 is a fragmentary, plan view of a further modified form of inventive twist lock assembly exposed through a cutout in a cargo carrying container.

In FIGS. 33-36, a further modified form of twist lock assembly, according to the invention, is shown at 178. The twist lock assembly 178 incorporates the aperture plate 92 and a slide plate 96" with the ISO standard aperture 98. The slide plate 96" has a flat body 179 with elongate, parallel walls/arms 180, 182 projecting upwardly therefrom. Biasing components/springs 184, making up part of a biasing mechanism, are interposed between the wall/arm 180 and a vertically extending wall 186. The biasing mechanism further includes like spring components 184 interposed between the other wall/arm 182 and a wall 188 that is integrated into a rear frame corner post 190. The biasing elements 184 resiliently urge the slide plate 96" towards a first centered position, as shown in FIG. 33.

Figure 34:
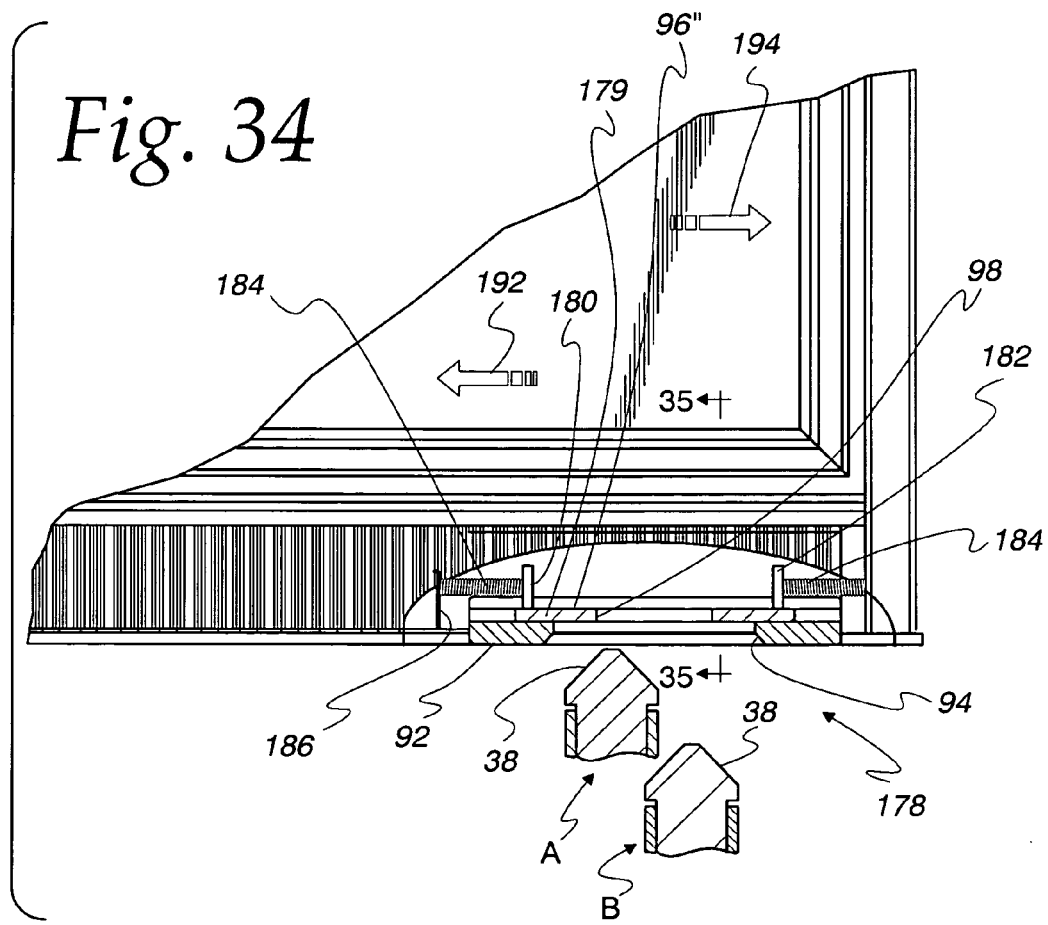
FIG. 34 is a fragmentary, partial cross-sectional view of the twist lock assembly in FIG. 33 with different enlarged heads situated to be directed through a slide plate aperture on the twist lock assembly with the enlarged heads associated with the "standard" and non-standard/modified chassis configurations.
Figure 35:
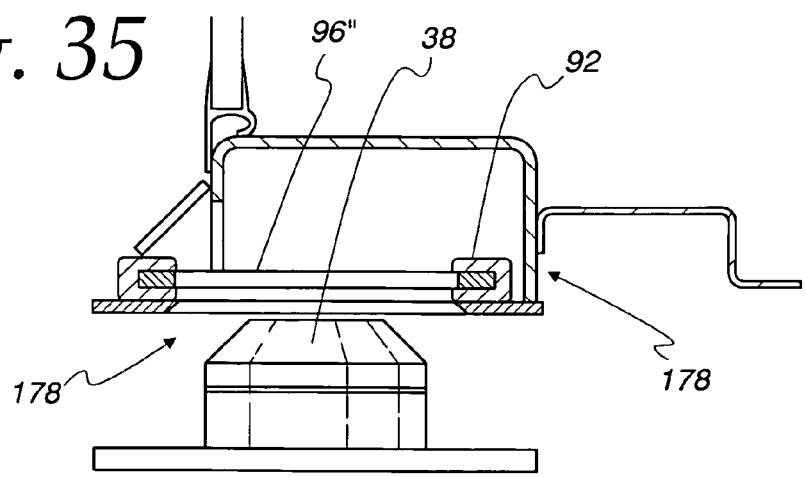
FIG. 35 is an enlarged, cross-sectional view of the twist-lock assembly taken along line 35-35 of FIG. 34.

The twist lock assembly 178 operates essentially in the same manner as the twist lock assemblies previously described. As shown in FIG. 34, with the enlarged head 38 at a standard spacing, as shown at A, the enlarged head 38 causes the slide plate 96" to shift laterally in the direction of the arrow 192 to register the enlarged head 38 with the aperture 98 and allow the enlarged head 38 to pass therethrough. With the non-standard/modified spacing for the enlarged head 38, as shown at B in FIG. 34, the enlarged head 38 cams the slide plate 96" oppositely, in the direction of the arrow 194 in FIG. 34, during the assembly process.

Figure 36:
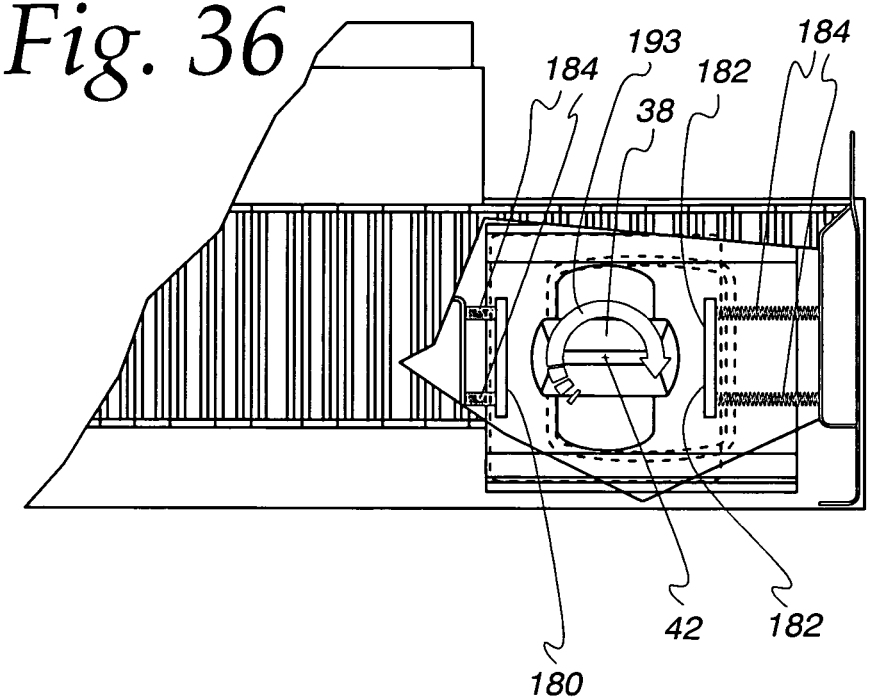
FIG. 36 is a view as in FIG. 33 wherein the enlarged head has been directed through the slide plate aperture and changed from an assembly/disassembly orientation into a holding orientation.

As shown in FIG. 36, with the slide plate 96" shifted in the direction of the arrow 192, the spring components 184, shown as coil springs, acting upon the wall/arm 180, are compressed, whereas the spring components 184, acting against the wall/arm 182, are extended.

Once the enlarged head 38 is passed fully through the apertures 94, 98, the enlarged head 38 can be turned, as indicated by the arrow 193 in FIG. 36, around the axis 42, to the holding orientation, as shown in FIG. 36.

This design is adaptable to containers wherein space is limited, as in a high-cube configuration wherein vertical height within the cargo space is maximized. A low profile design may be developed with this basic construction.

Figure 37:
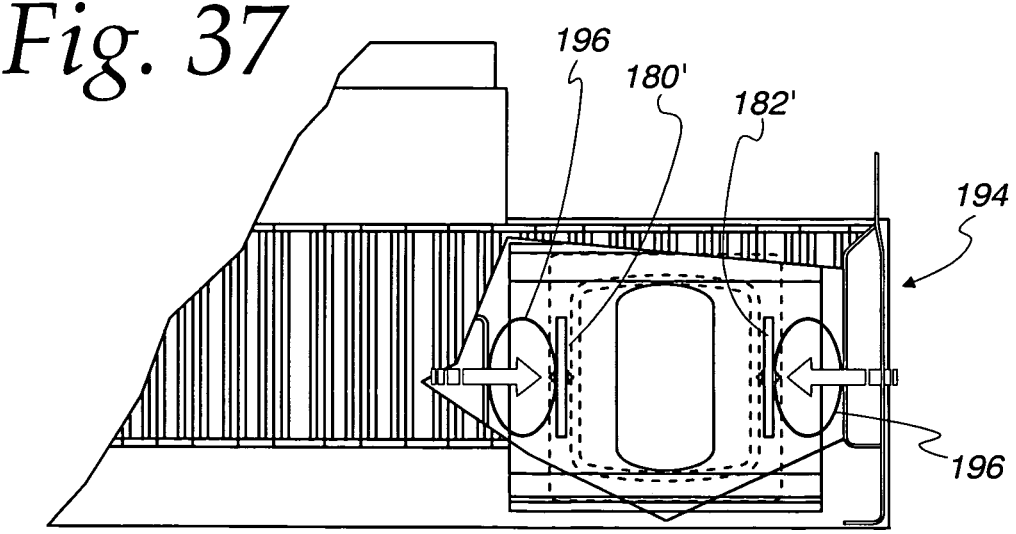
FIG. 37 is a view as in FIG. 33 of a further modified form of twist lock assembly and incorporating ring-shaped biasing springs for a slide plate.
Figure 38:
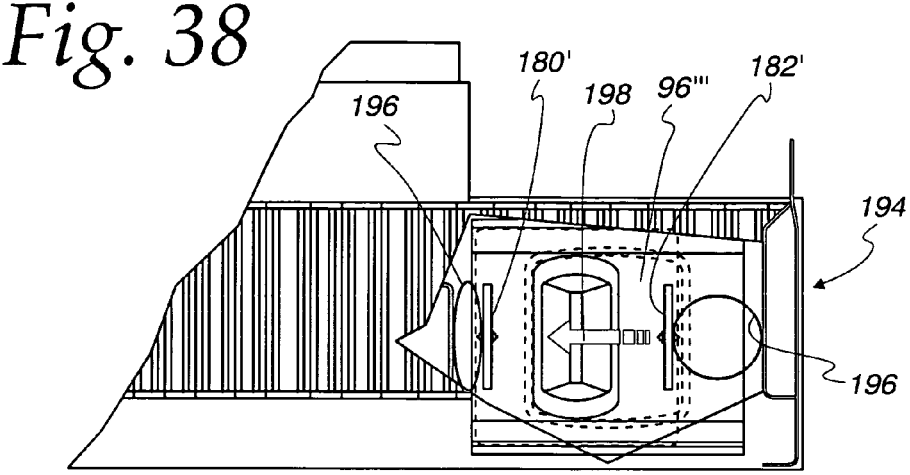
FIG. 38 is a view as in FIG. 37 wherein the slide plate has been deflected by an enlarged head on a cooperating twist lock assembly in one lateral direction.
Figure 39:
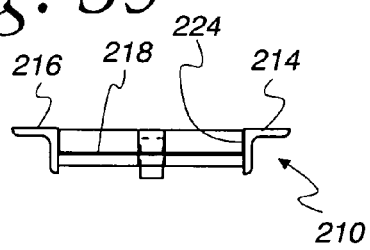
FIG. 39 is an enlarged, plan view of an adaptor assembly to fill a gap between the gooseneck and tunnel, as shown in FIG. 16.
Figure 41:
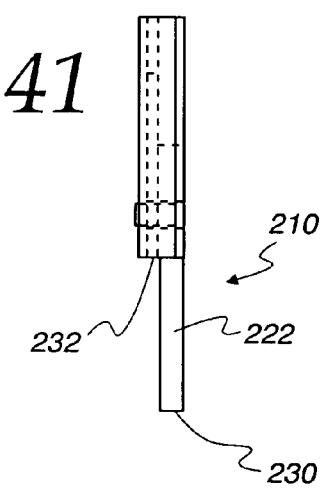
FIG. 41 is an enlarged, side elevation view of the adaptor assembly in the FIG. 40 state.

In FIGS. 37 and 38, a further modified form of twist lock assembly is shown at 194. The twist lock assembly 194 has a similar construction to the twist lock assembly 178, with the primary exception being that the multiple spring components 184 on opposite sides of the aperture 98 are replaced by a single ring-shaped/loop spring 196 on each side. Each loop spring 196 has a generally round starting shape and is compressed to the oval shape shown in FIG. 37, to cause a resilient centering force to be cooperatively applied to walls/arms 180', 182' on a slide plate 96''', corresponding to the walls 180, 182, on the twist lock assembly 178.

Shifting of the slide plate 96''' in the direction of the arrow 198 causes the spring associated with the wall 180' to collapse along its minor axis, while the spring associated with the other wall 182' is laterally extended in a parallel direction.

Figure 15:
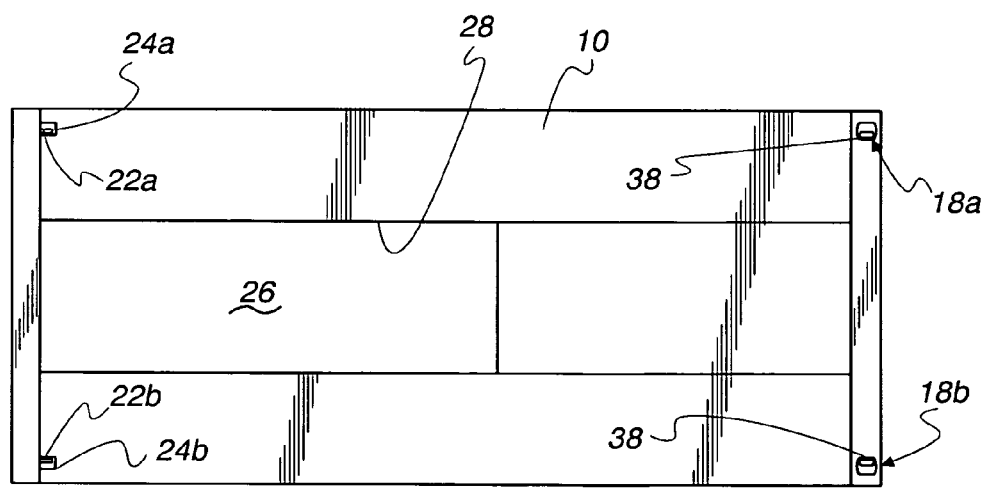
FIG. 15 is a schematic, plan representation of a "standard" chassis with lock pins and twist lock assemblies and with cooperating apertures and twist lock assemblies on the inventive cargo carrying container and further with a gooseneck on the chassis that fits within a tunnel on the cargo carrying container.

As seen in FIG. 15, with the standard chassis, the width-wise dimension of the tunnel 28 will closely accept the gooseneck 26.

Figure 16:
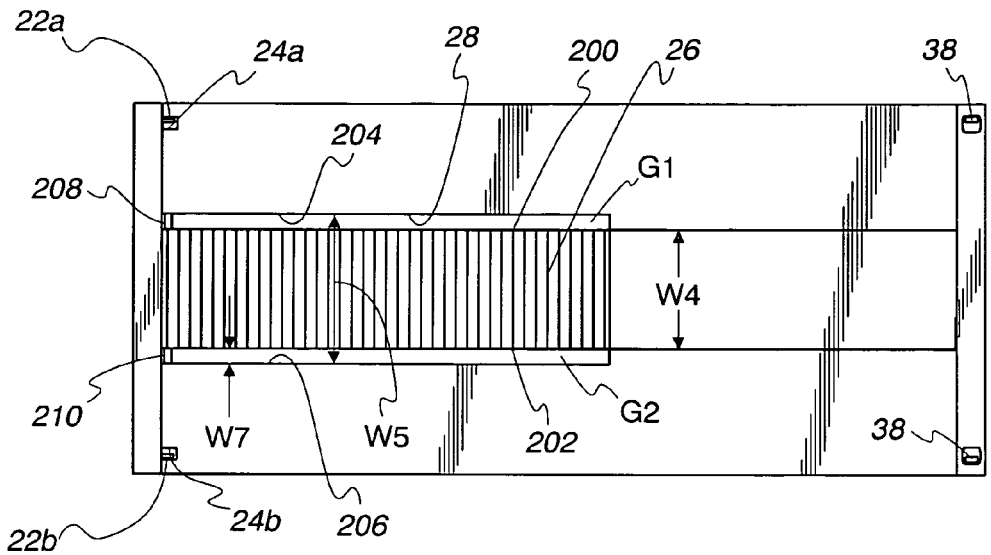
FIG. 16 is a view as in FIG. 15 wherein the inventive cargo carrying container is cooperating with a chassis having a non-standard/modified configuration.

With the modified chassis design, as shown in FIG. 16, the gooseneck 26 has a width W4 that is less than the width W5 of the tunnel 28. This results in gaps G1, G2 between spaced outer side walls 200, 202 on the gooseneck 26 and spaced, inner side walls 204, 206 bounding the tunnel 28.

To fill the gaps G1, G2, the container 12 is provided with spaced adaptor assemblies 208, 210, respectively associated with the gaps G1, G2. Details of the adaptor assemblies 208, 210 are shown in FIGS. 16 and 39-43.

Exemplary adaptor assembly 210 consists of a vertical mount 212 with upright legs 214, 216, each shown made from angle iron. A flat plate 218 connects between the legs 214, 216 and has an elongate, vertical slot 220 formed therethrough. An adaptor plate 222 nests in a guide receptacle 224 defined cooperatively by the plate 218 and legs 214, 216 and is guided thereby in vertical movement. The adaptor plate 222 has a fixed pin 226 that moves guidingly within the slot 220.

Figure 40:
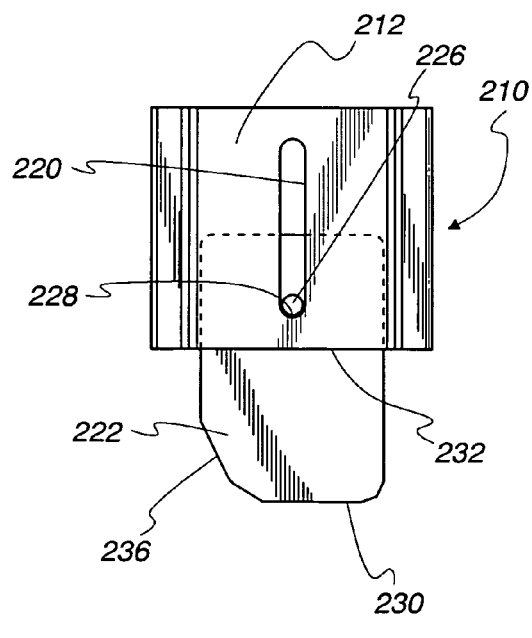
FIG. 40 is an enlarged, front elevation view of the adaptor assembly in FIG. 39 with an adaptor plate thereon in an operative position.

The adaptor plate 222 is designed to move under its own weight downwardly into an operative position as shown in FIG. 40, wherein the pin 226 abuts the bottom edge 228 of the slot 220. The adaptor plate 222 is movable to a raised position, as shown in FIG. 42. In the raised position, the bottom edge 230 of the adaptor plate 222 is substantially flush with the bottom edge 232 of the mount 212.

With a standard gooseneck width, as shown at W6 in FIG. 42, the bottom edge 230 of the adaptor plate 222 engages an upwardly facing surface 234 on the gooseneck 26. With the container 12 in its operative position upon the chassis 10, the adaptor plate edges 230, 232 abut to the gooseneck surface 234.

With the modified gooseneck 26, shown at FIG. 43, the adaptor plate 222 drops under its weight into the gap G2, thereby to preferably bridge substantially the entire width W7 thereof, as seen in FIG. 16.

The adaptor plate 222 has an angled edge 236 that provides clearance between the adaptor plate 222 and gooseneck edge 238. This avoids any interference between the adaptor plate 222 and gooseneck edge 238, as the adaptor plate 222 begins its downward descent, and allows the adaptor plate 222 to develop some momentum that will permit it to fully realize its operative position.

The adaptor assembly 208 has substantially the same construction as the adaptor assembly 210, and functions in substantially the same way to fill the gap G1. The only significant difference is that the edge 236', corresponding to the edge 236, is angled oppositely to interact with the gooseneck edge 240 in the same manner.

In FIGS. 15 and 16, the relationship between the above-described components on the container 12 and chassis 10, with the two different chassis configurations ("standard" and non-standard/modified), can be seen. In FIG. 15, the chassis is shown with the standard component spacing and dimensions, whereas the same components are shown with different dimensions/spacing in FIG. 16.

More particularly, as shown in FIG. 15, the lock pins 22a, 22b are located laterally towards the inside of the apertures 24a, 24b. The gooseneck 26 is closely received in the tunnel 28 and the enlarged heads 38 on the twist lock assemblies 18a, 18b align laterally at the inside regions of the apertures 94.

In FIG. 16, the lock pins 22a, 22b are located laterally at the outside regions of the apertures 24a, 24b. The enlarged heads 38 reside at the lateral outside regions of the apertures 94. Gaps G1, G2 are formed within the tunnel 208 and filled by the adaptor plates 222 on the adaptor assemblies 208, 210.

The invention contemplates many different variations from the basic structures described above, which are exemplary in nature only. As but one example as shown in FIG. 43, the apertures 244a, 244b, corresponding to the apertures 24a, 24b, may include dividing walls 246a, 246b that define separate chambers within which the lock pins 22a, 22b reside, depending upon the chassis configuration. More specifically, the aperture 244a has separate chambers 250, 252 within which the lock pin 22a respectively resides with the non-standard/modified and standard chassis constructions, respectively.

Further, while the different sliding plates have been shown to directly engage and block the enlarged heads 38 to prevent separation of the cargo carrying container from its associated chassis, there may be another component(s) interposed between each of the enlarged heads 38 and sliding plates, with the sliding plates providing reinforcement to the interposed component(s) and indirectly blocking the enlarged heads 38 from being withdrawn.

The foregoing disclosure of specific embodiments is intended to be illustrative of the broad concepts comprehended by the invention.

The invention claimed is:

1. In combination:
  a) a chassis comprising:
    a first frame; and
    a first twist lock assembly comprising a shaft with an enlarged head with a width and a length dimension,
    the enlarged head mounted to the first frame for guided movement around a first axis; and
  b) a cargo carrying container mounted in an operative position upon the chassis, the cargo carrying container comprising:
    a second frame; and
    a second twist lock assembly that cooperates with the first twist lock assembly in a manner whereby the cargo carrying container is selectively: a) maintained against separation from the chassis where the first and second twist lock assemblies interact; and b) allowed to separate from the chassis where the first and second twist lock assemblies interact,
  the second twist lock assembly comprising a slide plate with an aperture through which the enlarged head is passed in an axial direction with the enlarged head in an assembly/disassembly orientation;
  the first twist lock assembly and slide plate configured so that the enlarged head in the assembly/disassembly orientation moved relative to the slide plate in a first axial direction deflects the slide plate from a first position to allow the enlarged head to pass through the slide plate aperture,
  wherein at least one of: a) with the cargo carrying container in the operative position and the enlarged head passed through the slide plate aperture the enlarged head is movable around the first axis from the assembly/disassembly orientation into a holding orientation, wherein the enlarged head is blocked from being withdrawn from the slide plate aperture by the slide plate; and b) as an incident of the cargo carrying container being moved from a separated position into the operative position the enlarged head initially deflects the slide plate from the first position into a second position to allow the enlarged head to pass through the slide plate aperture, whereupon the enlarged head can be blocked by the slide plate from being withdrawn from the slide plate aperture,
  wherein with the cargo carrying container in the operative position and the enlarged head passed through the slide plate aperture and in the holding orientation, the enlarged head is blocked from being withdrawn from the slide plate aperture by the slide plate at diametrically opposite locations.

2. The combination according to claim 1 wherein the combined chassis and cargo carrying container have a width, the first and second twist lock assemblies cooperate with each other at a first location and there are third and fourth twist lock assemblies, respectively on the first and second frames, that cooperate with each other at a second location in the same manner that the first and second twist lock assemblies cooperate with each other at the first location, the first and second locations spaced widthwise from each other.

3. The combination according to claim 2 wherein the second and fourth twist lock assemblies are configured to cooperate with the first and third twist lock assemblies with the first and third twist lock assemblies spaced from each other different widthwise distances.

4. The combination according to claim 2 wherein the third twist lock assembly has a shaft with an enlarged head that moves around a second axis, the first and second axes are substantially parallel and spaced widthwise from each other, and the twist lock assemblies are configured to cooperate with each other with the first and second axes spaced from each other a distance in at least a range of 89.0-92.75 inches.

5. The combination according to claim 4 wherein the combined chassis and cargo carrying container have a front and a rear, the first and second twist lock assemblies are at the rear of the combined chassis and cargo carrying container, there are first and second lock pins on the front of the chassis that cooperate respectively with first and second apertures in the cargo carrying container to limit widthwise movement between the chassis and cargo carrying container, and the first and second apertures are configured to cooperate with the first and second lock pins with the first and second lock pins spaced from each other a distance in at least a range of 89.0-92.75 inches.

6. The combination according to claim 1 wherein the combined chassis and cargo carrying container have a front, a rear, and a width, the first and second twist lock assemblies are at the rear of the combined chassis and cargo carrying container, there are first and second lock pins on the front of the chassis that cooperate respectively with first and second apertures in the cargo carrying container to limit widthwise movement between the chassis and cargo carrying container, and the first and second apertures are configured to cooperate with the first and second lock pins with the first and second lock pins spaced from each other different widthwise distances.

7. The combination according to claim 1 wherein the slide plate is guided in translational movement within a slot.

8. In combination:
a) a chassis comprising:
a first frame; and
a first twist lock assembly comprising a shaft with an enlarged head with a width and a length dimension,
the enlarged head mounted to the first frame for guided movement around a first axis; and
b) a cargo carrying container mounted in an operative position upon the chassis, the cargo carrying container comprising:
a second frame; and
a second twist lock assembly that cooperates with the first twist lock assembly in a manner whereby the cargo carrying container is selectively: a) maintained against separation from the chassis where the first and second twist lock assemblies interact; and b) allowed to separate from the chassis where the first and second twist lock assemblies interact,
the second twist lock assembly comprising a slide plate with an aperture through which the enlarged head is passed in an axial direction with the enlarged head in an assembly/disassembly orientation;
the first twist lock assembly and slide plate configured so that the enlarged head in the assembly/disassembly orientation moved relative to the slide plate in a first axial direction deflects the slide plate from a first position to allow the enlarged head to pass through the slide plate aperture,
wherein at least one of: a) with the cargo carrying container in the operative position and the enlarged head passed through the slide plate aperture the enlarged head is movable around the first axis from the assembly/disassembly orientation into a holding orientation, wherein the enlarged head is blocked from being withdrawn from the slide plate aperture by the slide plate; and b) as an incident of the cargo carrying container being moved from a separated position into the operative position the enlarged head initially deflects the slide plate from the first position into a second position to allow the enlarged head to pass through the slide plate aperture, whereupon the enlarged head can be blocked by the slide plate from being withdrawn from the slide plate aperture,
wherein the combined chassis and cargo carrying container have a length, a width, a front and rear, the chassis has a gooseneck projection at the front of the combined chassis and cargo carrying container, the gooseneck projection having a first width between first and second spaced outer side walls, the cargo carrying container having a tunnel to receive the gooseneck projection, the tunnel having a width between first and second spaced inner side walls greater than the first width of the gooseneck projection so that with the cargo carrying container in the operative position there is a first widthwise gap between the first inner and outer side walls,
the cargo carrying container further comprising an adaptor assembly with a first adaptor plate, movable relative to the second frame, that resides within the first gap.

9. The combination according to claim 8 wherein the first adaptor plate is vertically and slidingly guided between a raised position and an operative position, the cargo carrying container capable of accommodating a chassis with a gooseneck projection with a width greater than the first width by causing the first adaptor plate to be maintained in the raised position with the cargo carrying container in the operative position.

10. The combination according to claim 9 wherein the adaptor plate moves under its own weight from the raised position into the operative position.

11. The combination according to claim 9 wherein there is a second widthwise gap between the second inner and outer guide walls, the adaptor assembly further comprises a second movable adaptor plate that resides within the second gap, and the second adaptor plate is vertically and slidingly guided between a raised and operative position.

12. The combination according to claim 11 wherein with both of the adaptor plates in their raised positions the tunnel will accommodate the gooseneck projection with a width of up to 40 inches and with the adaptor plates in their operative positions the tunnel will accommodate the gooseneck projection with a width of up to 32 inches.

13. The combination according to claim 8 wherein the adaptor assembly is at the front of the combined chassis and cargo carrying container.

14. In combination:
a) a chassis comprising:
a first frame; and
a first twist lock assembly comprising a shaft with an enlarged head with a width and a length dimension,
the enlarged head mounted to the first frame for guided movement around a first axis; and
b) a cargo carrying container mounted in an operative position upon the chassis, the cargo carrying container comprising:
a second frame; and
a second twist lock assembly that cooperates with the first twist lock assembly in a manner whereby the cargo carrying container is selectively: a) maintained against separation from the chassis where the first and second twist lock assemblies interact; and b) allowed to separate from the chassis where the first and second twist lock assemblies interact,
the second twist lock assembly comprising a slide plate with an aperture through which the enlarged head is passed in an axial direction with the enlarged head in an assembly/disassembly orientation;
the first twist lock assembly and slide plate configured so that the enlarged head in the assembly/disassembly orientation moved relative to the slide plate in a first axial direction deflects the slide plate from a first position to allow the enlarged head to pass through the slide plate aperture,
wherein at least one of: a) with the cargo carrying container in the operative position and the enlarged head passed through the slide plate aperture the enlarged head is movable around the first axis from the assembly/disassembly orientation into a holding orientation, wherein the enlarged head is blocked from being withdrawn from the slide plate aperture by the slide plate; and b) as an incident of the cargo carrying container being moved from a separated position into the operative position the enlarged head initially deflects the slide plate from the first position into a second position to allow the enlarged head to pass through the slide plate aperture, whereupon the enlarged head can be blocked by the slide plate from being withdrawn from the slide plate aperture, wherein the slide plate is urged by a bias force toward the first position and the enlarged head deflects the slide plate against the bias force as the enlarged head moves in the first axial direction.

15. In combination:
a) a chassis comprising:
  a first frame; and
  a first twist lock assembly comprising a shaft with an enlarged head with a width and a length dimension,
  the enlarged head mounted to the first frame for guided movement around a first axis; and
b) a cargo carrying container mounted in an operative position upon the chassis, the cargo carrying container comprising:
  a second frame; and
  a second twist lock assembly that cooperates with the first twist lock assembly in a manner whereby the cargo carrying container is selectively: a) maintained against separation from the chassis where the first and second twist lock assemblies interact; and b) allowed to separate from the chassis where the first and second twist lock assemblies interact,
  the second twist lock assembly comprising a slide plate with an aperture through which the enlarged head is passed in an axial direction with the enlarged head in an assembly/disassembly orientation;
  the first twist lock assembly and slide plate configured so that the enlarged head in the assembly/disassembly orientation moved relative to the slide plate in a first axial direction deflects the slide plate from a first position to allow the enlarged head to pass through the slide plate aperture,
  wherein at least one of: a) with the cargo carrying container in the operative position and the enlarged head passed through the slide plate aperture the enlarged head is movable around the first axis from the assembly/disassembly orientation into a holding orientation, wherein the enlarged head is blocked from being withdrawn from the slide plate aperture by the slide plate; and b) as an incident of the cargo carrying container being moved from a separated position into the operative position the enlarged head initially deflects the slide plate from the first position into a second position to allow the enlarged head to pass through the slide plate aperture, whereupon the enlarged head can be blocked by the slide plate from being withdrawn from the slide plate aperture, wherein the shaft moves as one piece with the enlarged head and is guided for movement around the first axis within a sleeve, the sleeve having an outer surface with a diameter approximately equal to or greater than the width of the enlarged head, the sleeve outer surface bearing upon the plate and guiding withdrawal of the enlarged head through the slide plate aperture with the enlarged head in the assembly/disassembly orientation.

16. In combination:
a) a chassis comprising:
  a first frame; and
  a first twist lock assembly comprising a shaft with an enlarged head with a width and a length dimension,
  the enlarged head mounted to the first frame for guided movement around a first axis; and
b) a cargo carrying container mounted in an operative position upon the chassis, the cargo carrying container comprising:
  a second frame; and
  a second twist lock assembly that cooperates with the first twist lock assembly in a manner whereby the cargo carrying container is selectively: a) maintained against separation from the chassis where the first and second twist lock assemblies interact; and b) allowed to separate from the chassis where the first and second twist lock assemblies interact,
  the second twist lock assembly comprising a slide plate with an aperture through which the enlarged head is passed in an axial direction with the enlarged head in an assembly/disassembly orientation;
  the first twist lock assembly and slide plate configured so that the enlarged head in the assembly/disassembly orientation moved relative to the slide plate in a first axial direction deflects the slide plate from a first position to allow the enlarged head to pass through the slide plate aperture,
  wherein at least one of: a) with the cargo carrying container in the operative position and the enlarged head passed through the slide plate aperture the enlarged head is movable around the first axis from the assembly/disassembly orientation into a holding orientation, wherein the enlarged head is blocked from being withdrawn from the slide plate aperture by the slide plate; and b) as an incident of the cargo carrying container being moved from a separated position into the operative position the enlarged head initially deflects the slide plate from the first position into a second position to allow the enlarged head to pass through the slide plate aperture, whereupon the enlarged head can be blocked by the slide plate from being withdrawn from the slide plate aperture, wherein the first twist lock assembly comprises an aperture plate that guides movement of the slide plate and the aperture plate has a fully surrounded aperture with an area larger than an area of the slide plate aperture.

17. In combination:
a) a chassis comprising:
  a first frame; and
  a first twist lock assembly comprising a shaft with an enlarged head with a width and a length dimension,
  the enlarged head mounted to the first frame for guided movement around a first axis; and
b) a cargo carrying container mounted in an operative position upon the chassis, the cargo carrying container comprising:
  a second frame; and
  a second twist lock assembly that cooperates with the first twist lock assembly in a manner whereby the cargo carrying container is selectively: a) maintained against separation from the chassis where the first and second twist lock assemblies interact; and b) allowed to separate from the chassis where the first and second twist lock assemblies interact,
  the second twist lock assembly comprising a slide plate with an aperture through which the enlarged head is passed in an axial direction with the enlarged head in an assembly/disassembly orientation;

the first twist lock assembly and slide plate configured so that the enlarged head in the assembly/disassembly orientation moved relative to the slide plate in a first axial direction deflects the slide plate from a first position to allow the enlarged head to pass through the slide plate aperture, wherein at least one of: a) with the cargo carrying container in the operative position and the enlarged head passed through the slide plate aperture the enlarged head is movable around the first axis from the assembly/disassembly orientation into a holding orientation, wherein the enlarged head is blocked from being withdrawn from the slide plate aperture by the slide plate; and b) as an incident of the cargo carrying container being moved from a separated position into the operative position the enlarged head initially deflects the slide plate from the first position into a second position to allow the enlarged head to pass through the slide plate aperture, whereupon the enlarged head can be blocked by the slide plate from being withdrawn from the slide plate aperture, wherein the slide plate has a substantially flat body with a first transverse arm and there is a biasing mechanism that acts against the first arm and thereby resiliently urges the slide plate into its first position.

18. In combination:

a) a chassis comprising:
   a first frame; and
   a first twist lock assembly comprising a shaft with an enlarged head with a width and a length dimension,
   the enlarged head mounted to the first frame for guided movement around a first axis; and b) a cargo carrying container mounted in an operative position upon the chassis, the cargo carrying container comprising:
   a second frame; and
   a second twist lock assembly that cooperates with the first twist lock assembly in a manner whereby the cargo carrying container is selectively: a) maintained against separation from the chassis where the first and second twist lock assemblies interact; and b) allowed to separate from the chassis where the first and second twist lock assemblies interact,
   the second twist lock assembly comprising a slide plate with an aperture through which the enlarged head is passed in an axial direction with the enlarged head in an assembly/disassembly orientation;
   the first twist lock assembly and slide plate configured so that the enlarged head in the assembly/disassembly orientation moved relative to the slide plate in a first axial direction deflects the slide plate from a first position to allow the enlarged head to pass through the slide plate aperture, wherein at least one of: a) with the cargo carrying container in the operative position and the enlarged head passed through the slide plate aperture the enlarged head is movable around the first axis from the assembly/disassembly orientation into a holding orientation, wherein the enlarged head is blocked from being withdrawn from the slide plate aperture by the slide plate; and b) as an incident of the cargo carrying container being moved from a separated position into the operative position the enlarged head initially deflects the slide plate from the first position into a second position to allow the enlarged head to pass through the slide plate aperture, whereupon the enlarged head can be blocked by the slide plate from being withdrawn from the slide plate aperture, wherein the slide plate is resiliently urged into its first position.

19. In combination:

a) a chassis comprising:
   a first frame; and
   a first twist lock assembly comprising a shaft with an enlarged head with a width and a length dimension,
   the enlarged head mounted to the first frame for guided movement around a first axis; and b) a cargo carrying container mounted in an operative position upon the chassis, the cargo carrying container comprising:
   a second frame; and
   a second twist lock assembly that cooperates with the first twist lock assembly in a manner whereby the cargo carrying container is selectively: a) maintained against separation from the chassis where the first and second twist lock assemblies interact; and b) allowed to separate from the chassis where the first and second twist lock assemblies interact,
   the second twist lock assembly comprising a slide plate with an aperture through which the enlarged head is passed in an axial direction with the enlarged head in an assembly/disassembly orientation;
   the first twist lock assembly and slide plate configured so that the enlarged head in the assembly/disassembly orientation moved relative to the slide plate in a first axial direction deflects the slide plate from a first position to allow the enlarged head to pass through the slide plate aperture, wherein at least one of: a) with the cargo carrying container in the operative position and the enlarged head passed through the slide plate aperture the enlarged head is movable around the first axis from the assembly/disassembly orientation into a holding orientation, wherein the enlarged head is blocked from being withdrawn from the slide plate aperture by the slide plate; and b) as an incident of the cargo carrying container being moved from a separated position into the operative position the enlarged head initially deflects the slide plate from the first position into a second position to allow the enlarged head to pass through the slide plate aperture, whereupon the enlarged head can be blocked by the slide plate from being withdrawn from the slide plate aperture, wherein the slide plate is resiliently urged into its first position by forces that act in opposite directions upon the slide plate.

20. In combination:

a) a chassis comprising:
   a first frame; and
   a first twist lock assembly comprising a shaft with an enlarged head with a width and a length dimension,
   the enlarged head mounted to the first frame for guided movement around a first axis; and b) a cargo carrying container mounted in an operative position upon the chassis, the cargo carrying container comprising:
   a second frame; and
   a second twist lock assembly that cooperates with the first twist lock assembly in a manner whereby the cargo carrying container is selectively: a) maintained against separation from the chassis where the first and second twist lock assemblies interact; and b) allowed to separate from the chassis where the first and second twist lock assemblies interact, the second twist lock assembly comprising a slide plate with an aperture through which the enlarged head is passed in an axial direction with the enlarged head in an assembly/disassembly orientation;

the first twist lock assembly and slide plate configured so that the enlarged head in the assembly/disassembly orientation moved relative to the slide plate in a first axial direction deflects the slide plate from a first position to allow the enlarged head to pass through the slide plate aperture, wherein at least one of: a) with the cargo carrying container in the operative position and the enlarged head passed through the slide plate aperture the enlarged head is movable around the first axis from the assembly/disassembly orientation into a holding orientation, wherein the enlarged head is blocked from being withdrawn from the slide plate aperture by the slide plate; and b) as an incident of the cargo carrying container being moved from a separated position into the operative position the enlarged head initially deflects the slide plate from the first position into a second position to allow the enlarged head to pass through the slide plate aperture, whereupon the enlarged head can be blocked by the slide plate from being withdrawn from the slide plate aperture, wherein with the cargo carrying container in the operative position and the enlarged head passed through the slide plate aperture and in the holding orientation, the enlarged head is blocked from being withdrawn from the slide plate aperture by the slide plate at diametrically opposite locations, wherein the combined chassis and cargo carrying container have a width, the first and second twist lock assemblies cooperate with each other at a first location and there are third and fourth twist lock assemblies, respectively on the first and second frames, that cooperate with each other at a second location in the same manner that the first and second twist lock assemblies cooperate with each other at the first location, the first and second locations spaced widthwise from each other, wherein the second and fourth twist lock assemblies are configured to cooperate with the first and third twist lock assemblies with the first and third lock assemblies spaced from each other different widthwise distances.

\* \* \* \* \*